(12) United States Patent
Scharber et al.

(10) Patent No.: US 10,148,727 B2
(45) Date of Patent: *Dec. 4, 2018

(54) METHODS AND SYSTEMS FOR AN END-TO-END SOLUTION TO DELIVER CONTENT IN A NETWORK

(71) Applicant: Vidscale Services, Inc., Cambridge, MA (US)

(72) Inventors: John M. Scharber, Placerville, CA (US); Richard Pugh, Phoenix, AZ (US); Michael Kilian, Harvard, MA (US); Charles Alexander Nelson, Belmont, MA (US); Bill Wilcox, Groton, MA (US)

(73) Assignee: Vidscale Services, Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/588,383

(22) Filed: Dec. 31, 2014

(65) Prior Publication Data
US 2016/0191600 A1 Jun. 30, 2016

(51) Int. Cl.
*H04L 29/08* (2006.01)
*H04L 12/24* (2006.01)
*H04L 29/12* (2006.01)

(52) U.S. Cl.
CPC .......... *H04L 67/02* (2013.01); *H04L 41/0253* (2013.01); *H04L 41/145* (2013.01); *H04L 41/5054* (2013.01); *H04L 67/1097* (2013.01); *H04L 67/2823* (2013.01); *H04L 41/0886* (2013.01); *H04L 61/1511* (2013.01); *H04L 61/1523* (2013.01); *H04L 61/2007* (2013.01)

(58) Field of Classification Search
CPC ......... H04L 67/10; H04L 67/16; H04L 63/20; H04L 41/50; H04L 67/1097
USPC ................................. 709/223, 225, 235, 245
See application file for complete search history.

(56) References Cited

U.S. PATENT DOCUMENTS

| 7,653,689 | B1 | 1/2010 | Champagne et al. |
| 8,635,318 | B1 | 1/2014 | Shankar et al. |
| 8,825,830 | B2 | 9/2014 | Newton et al. |
| 8,863,143 | B2 * | 10/2014 | Jackson ................ G06F 9/5083 718/105 |

(Continued)

OTHER PUBLICATIONS

Fastly—The Next Gen CDN, "Streaming Media," date accessed Dec. 18, 2014, 2 pages.

(Continued)

*Primary Examiner* — David R Lazaro
*Assistant Examiner* — Berhanu Shitayewoldetadik
(74) *Attorney, Agent, or Firm* — Ascenda Law Group, PC

(57) ABSTRACT

Described herein is an end-to-end solution (i.e., capable of constructing a content delivery network all the way from an origin server to end user devices) which provides a managerial overview to what has been a very disjoint build-out of networks. In the past, networks have evolved to serve particular needs, as opposed to being architected from a strategic view. What this does is to allow someone (e.g., content provider, network operator, etc.) to impose a strategy over those networks. Rather than having to construct solutions that deliver a particular kind of content, a particular security requirement, a particular latency requirement, etc., one can simply provision particular types of nodes as needed when needed.

17 Claims, 37 Drawing Sheets

(56) References Cited

U.S. PATENT DOCUMENTS

| | | | |
|---|---|---|---|
| 8,914,514 B1 | 12/2014 | Jenkins et al. | |
| 2003/0084341 A1* | 5/2003 | Ramachandran | G06Q 30/02 726/4 |
| 2005/0086342 A1 | 4/2005 | Burt et al. | |
| 2007/0179955 A1* | 8/2007 | Croft | G06F 3/1415 |
| 2010/0036908 A1* | 2/2010 | Leblanc | G06F 17/30905 709/203 |
| 2010/0042681 A1 | 2/2010 | Jeon et al. | |
| 2011/0029673 A1 | 2/2011 | Jaisinghani | |
| 2011/0078230 A1* | 3/2011 | Sepulveda | H04N 21/222 709/203 |
| 2011/0116376 A1* | 5/2011 | Pacella | G06F 11/1076 370/235 |
| 2012/0005325 A1* | 1/2012 | Kanodia | G06F 8/61 709/223 |
| 2012/0016778 A1* | 1/2012 | Salle | G06F 9/5072 705/27.1 |
| 2012/0066487 A1* | 3/2012 | Brown | G06F 9/5083 713/150 |
| 2012/0130871 A1* | 5/2012 | Weller | G06Q 40/04 705/30 |
| 2012/0233668 A1* | 9/2012 | Leafe | G06F 9/44526 726/4 |
| 2012/0314575 A1* | 12/2012 | Frank | H04L 41/0896 370/235 |
| 2013/0159487 A1* | 6/2013 | Patel | H04L 67/1031 709/223 |
| 2013/0185408 A1* | 7/2013 | Ngo | H04L 41/046 709/223 |
| 2013/0232497 A1 | 9/2013 | Jalagam et al. | |
| 2013/0304788 A1* | 11/2013 | DeLuca | G06F 8/61 709/201 |
| 2014/0082614 A1* | 3/2014 | Klein | G06F 9/45558 718/1 |
| 2014/0181004 A1* | 6/2014 | Said | G06F 17/30563 707/602 |
| 2014/0192676 A1 | 7/2014 | Sullivan | |
| 2014/0365662 A1 | 12/2014 | Dave et al. | |
| 2015/0106523 A1* | 4/2015 | Cui | H04L 67/1036 709/226 |

OTHER PUBLICATIONS

NetCracker Technologies Corp., "Service Orchestrator," date accessed Dec. 17, 2014, 2 pages.
PeerApp, "Transparent Caching in DSL Operator Networks," date accessed Dec. 18, 2014, 2 pages.
LightReading, "Alcatel-Lucent Unveils Velocix Virtual CDN," LightReading—Networking the Telecom Community, Sep. 10, 2014, 5 pages.
Server Fault, "Haproxy—High availability without dropping connections," Jun. 1, 2011, 2 pages.
Wikipedia, the free encyclopedia, "Content Delivery Network," Dec. 29, 2014, 10 pages.
R. Buyya, M. Pathan, "Content Delivery Networks: Overlay Networks for Scaling and Enhancing in the Web," GRIDS Laboratory Dept. of Computer Science and Software Engineering; The University of Melbourne, Australia, 2008, 19 pages, Chennai, India.
Ericsson, "Media Delivery Network," date accessed Dec. 18, 2014, 2 pages.
Schwarz, Benjamin et al., "CTOiC White Paper—Content Delivery Networks 3.0," CTOiC Consulting and Broadpeak, Dec. 2012, 20 pages.
RGB Networks, Inc., "White Paper—Adaptive Streaming Ad Insertion: Modifying Playlists to Deliver Targeted Ads Using HTTP Adaptive Streaming," 2011, 8 pages.
Cyan, Inc., "Blue Planet SDN and NFV Orchestration Platform," date accessed Dec. 16, 2014, 13 pages.
MacVittie, Lori, "White Paper—Cloud Balancing: The Evolution of Global Server Load Balancing," F5 Networks, 2012, 12 pages.
Ericsson, "Ericsson deploys world's largest operator CDN for Rostelecom," Sep. 12, 2013, 4 pages.
Netflix, "Netflix Open Connect Content Delivery for ISPs," date accessed Dec. 20, 2014, 3 pages.
Alcatel-Lucent, "Why Service Providers need an NFV Platform: Strategic White Paper," Nov. 29, 2013, 12 pages.
Skinner, Tim, "Orchestrating the virtual," SDN World Series Blog, Jul. 3, 2014, 6 pages, Software Defined Networking and Virtualisation Summit.
Arolovitch, Alan, "Second-Screen Experiences and Revenue Opportunities," PeerApp: Press Releases, date accessed Dec. 18, 2014, 2 pages.
International Search Report and Written Opinion dated Mar. 3, 2016, from the International Searching Authority, for International Patent Application No. PCT/US15/67180 (filed Dec. 21, 2015), 13 pages.
International Search Report and Written Opinion dated Mar. 4, 2016, by the International Searching Authority, for International Patent Application No. PCT/US15/67174 (filed Dec. 21, 2015), 17 pgs.
Non-Final Office Action dated Aug. 11, 2016, for U.S. Appl. No. 14/588,386, filed Dec. 31, 2014, 16 pages.
Amendment and Response to Office Action filed Jan. 9, 2017, for U.S. Appl. No. 14/588,386, filed Dec. 31, 2014, 9 pages.
International Preliminary Report on Patentability dated Jul. 13, 2017, from The International Bureau of WIPO, for International Application No. PCT/US2015/067174 (filed Dec. 21, 2015), 7 pages.
International Preliminary Report on Patentability dated Jul. 13, 2017, from The International Bureau of WIPO, for International Application No. PCT/US2015/067180 (filed Dec. 21, 2015), 5 pages.
Final Office Action dated Apr. 6, 2017, for U.S. Appl. No. 14/588,386, filed Dec. 31, 2014, 18 pages.
Amendment filed Jul. 5, 2017, for U.S. Appl. No. 14/588,386, filed Dec. 31, 2014, 13 pages.
Amendment filed Mar. 26, 2018, for U.S. Appl. No. 14/588,386, filed Dec. 31, 2014, 9 pages.
Non-Final Office Action dated Oct. 25, 2017, for U.S. Appl. No. 14/588,386, filed Dec. 31, 2014, 37 pages.
Extended European Search dated Jul. 10, 2018, from the European Patent Office, for EP App. No. 15876019.9 (filed Dec. 21, 2015), 12 pages.
Nguyen; et al., "Blueprint Template Support for Engineering Cloud-Based Services", In: Abramowicz; et al. (Eds) Towards a Service-Based Internet. ServiceWave 2011, LNCS 6994:26-37, Springer, Berlin, Heidelberg.
Notice of Allowance dated Jun. 1, 2018, for U.S. Appl. No. 14/588,386, filed Dec. 31, 2014, 11 pages.

\* cited by examiner

METHODS AND SYSTEMS FOR AN END-TO-END SOLUTION TO DELIVER CONTENT IN A NETWORK

FIELD OF THE INVENTION

The present invention relates to methods and systems for distributing content in a communication network, and more particularly relates to an extensible framework that allows content distribution nodes to be instantiated and configured at any point along the communication network.

BACKGROUND

FIG. 1 depicts a conventional communication network 100 in which content (e.g., pictures, music, video, etc.) is distributed from origin server 102 to end user devices 112A-112P. Origin server 102 may be operated by one or more content providers (e.g., media companies, e-commerce vendors, etc.) some example of which include Netflix, Inc.™ of Los Gatos, Calif.; Amazon.com, Inc.™, of Seattle, Wash.; CBS# of New York City, N.Y.; The Walt Disney Company™ of Burbank, Calif.

Origin server 102 may be communicatively coupled to end user devices 112A-112P through content delivery network (CDN) 104 and operator network 110. CDN 104 may include a distributed system of servers, in which a server is either a physical server or a process hosted on a virtual machine. Such servers may be called CDN servers, CDN nodes or content delivery nodes. For simplicity, CDN 104 is depicted with two servers: a CDN ingress 106 and a CDN egress 108, which are communicatively coupled to one another. CDN ingress 106 is configured to receive content from origin server 102 and distribute the content to CDN egress 108. CDN egress 108 is configured to receive content from CDN ingress 106 and distribute the content to the operator network 110. Operator network 110 then delivers the content to end users 112A-112P.

A CDN serves several purposes in communication network 100. First, it may provide the functionality of a web cache, allowing frequently requested content to be cached at a location that is geographically closer to end user devices 112A-112P, as compared to the location of origin server 102. As a result, content can be served to end user devices 112A-112P with less latency (as compared to the content being served directly from origin server 102). As an additional benefit of the caching functionality, the load on origin server 102 can be reduced (i.e., origin server 102 can experience less requests). Second, it may allow dynamic content (e.g., Internet Protocol television (IPTV), etc.) to be transmitted to end user devices 112A-112P in real time (or near real time). The rapid delivery of content may be enabled, in part, by a dedicated network between CDN ingress 106 and CDN egress 108 (i.e., dedicated to the operator of the CDN). Examples of CDN operators include Akamai Technologies™ of Cambridge, Mass.; Limelight Networks™ of Tempe, Ariz.; and Level 3 Communications, Inc.™ of Broomfield, Colo.

Operator network 110 may be a wired and/or wireless network. For example, operator network 110 may include a carrier network, an Internet service provider (ISP), etc. According to customary terminology, operator network 110 may be provided by an "network operator" or an "operator" (not to be confused with a "CDN operator"). Examples of operators include AT&T™ of Dallas, Tex.; Vodafone Group Plc™ of Newbury, UK; and T-Mobile US, Inc.™, of Bellevue, Wash.

End user devices 112A-112P may include desktop computers, laptop computers, tablet computing devices, mobile phones, televisions, etc., each of which may be operated by one or more end users.

In communication network 100, content providers may pay CDN operators for delivering their content through (and/or caching their content within) CDN 104. More recently, some content providers (e.g., Netflix) have decided to bypass the CDN operators altogether, opting to place their own CDNs (e.g., Open Connect™ CDN from Netflix) inside of operator network 110. This mode of operation has the advantage of not only saving money that otherwise would be paid to the CDN operators, but also places content closer to end user devices 112A-112P resulting in faster transmission that improves the quality of the service for the end users (e.g., content consumers) than could otherwise be possible via CDN 104.

FIG. 2 illustrates communication network 200, in accordance one embodiment of the above-described scheme that bypasses CDN operators. In communication network 200, origin server 102 of a content provider is directly coupled to operator network 110 (without CDN 104 there between). Within operator network 110 are CDN nodes provided by the content provider (e.g., content provider CDN ingresses 202A-202N, content provider CDN egresses 206A-206M). Each of content provider CDN ingresses 202A-202N may receive content from origin server 102, and distribute the received content to one or more of content provider CDN egresses 206A-206M via switch 204. Each of content provider CDN egresses 206A-206M may, in turn, distribute the content of origin server 102 to one or more of end user devices 112A-112P.

While communication network 200 provides the above-mentioned advantages to the content provider (which owns the CDN nodes inserted within the operator network), operators (i.e., of operator network 110) are faced with the challenge of integrating an increasing number of CDN nodes from an increasing number of content providers within their network (i.e., operator network 110). While operators may benefit from such collaboration with content providers (e.g., in terms of reduced traffic backhaul onto the operator network, payment from content providers to host CDNs within datacenters of the operators, etc.), the existing operator network is simply not designed for third-party CDNs to be inserted into the operator network upon the request of content providers. Further, in both communication networks 100 and 200, operators are further presented with the dilemma of being relegated to a "dumb pipe" and relinquishing more lucrative content delivery services to CDN operators (in communication network 100 of FIG. 1) and content providers (in communication network 200 of FIG. 2). Some aspects of the description below provide solutions to alleviate such problems of the network operator, as well as providing conveniences to content providers.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps. While the flow diagrams each present a series of steps in a certain order, the order of the steps may be changed.

Figure 2:
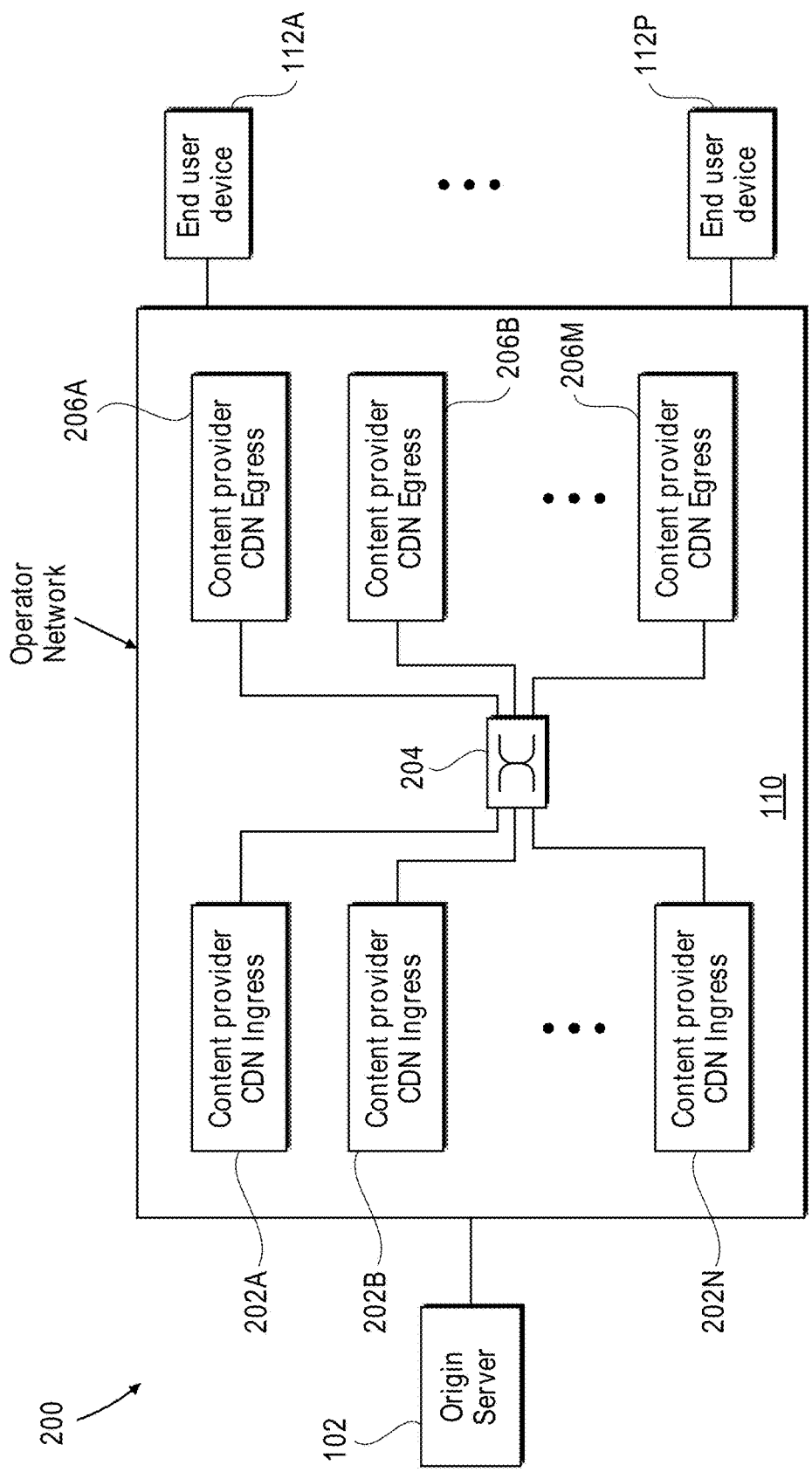
FIG. 2 depicts a communication network for distributing content from an origin server to end user devices.

In accordance with one embodiment of the invention, a platform is provided that allows content providers (or network operators or even CDN operators) to instantiate nodes anywhere along the content delivery chain (i.e., anywhere between and including origin server 102 and end user devices 112A-112P). These nodes may be instantiated within operator network 110 without requiring the content provider to place a piece of physical hardware within operator network 110 (as was required in communication network 110 of FIG. 2). To elaborate, the nodes may be instantiated as a process in a cloud computing platform, such as Amazon EC2 and Amazon S3. These nodes may be origin servers, CDN ingresses, CDN egresses, etc. The platform also allows the content providers to communicatively couple the instantiated nodes, in essence, allowing content providers to design and deploy a content delivery network that is overlaid on (or integrated within) operator network 110.

Figure 3:
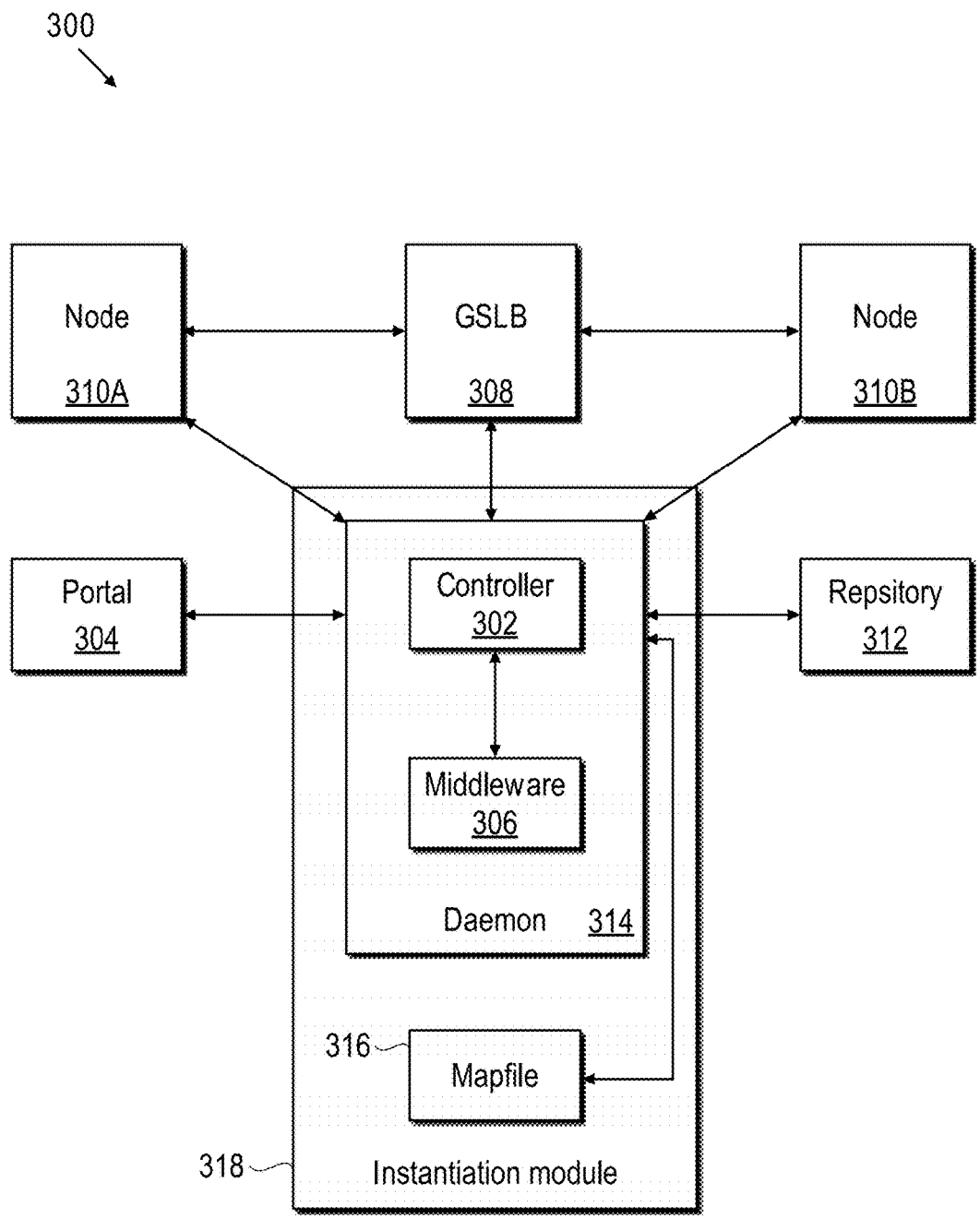
FIGS. 3-4 depict block diagrams of a system that allows content providers to design and deploy a content delivery network, in accordance with one embodiment of the invention.

FIG. 3 depicts a high-level block diagram of system 300 (i.e., one embodiment of the above-described platform) that allows content providers to design and deploy a content delivery network, in accordance with one embodiment of the invention. First, a content provider may use portal 304 (e.g., a web portal) to specify requirements (e.g., services) for each node (e.g., each node being one or more of an origin server, CDN ingress, CDN egress, etc.) and the particular coupling means between each of the nodes. For simplicity of description, the remainder of the description will primarily associate a content provider as the user of portal 304, but this is not necessarily so. As previously mentioned, a network operator or even a CDN operator may operate portal 304. In another embodiment, the functionality of portal 304 may be integrated with another portal (not depicted) or an application (not depicted).

In essence, portal 304 may be used to specify the "blueprint" for the content delivery network. Portal 304 may communicate this design information to repository 312 (described below) by way of daemon 314 (of instantiation module 318). Then, daemon 314 may create map file 316 (which defines what should be built where) based on the design information stored in repository 312. Map file 316 may then be provided as input to middleware 306, which may deploy a content distribution network (with one or more nodes) as specified by map file 316. Middleware 306 then may register the address (e.g., IP address) of each of the nodes that are provisioned at global software load balancer (GSLB) 308, so that GSLB can make the services of newly provisioned nodes available to existing nodes and end user devices 112A-112P.

The following are other functions that may be performed by middleware 306: For example, middleware 306 may convert the location of a node specified in international air transport association (IATA) codes into a city, state country (or vice versa). More generally, middleware 306 may allow nodes to be provisioned on any cloud platform (e.g., Digital Ocean, Inc.™ of New York City, N.Y.; Amazon EC2; etc.). Nodes that are provisioned may then be normalized by middleware 306 (e.g., image operating system—whether it is Windows, Linux, etc.—of virtual machine may be normalized, function calls may be normalized, data types may be normalized), allowing a unified view of the nodes across any cloud platform. Further, middleware 306 may also allow functions to be invoked across various virtual machines of the cloud platform. In essence, middleware 306 is an abstraction layer, allowing controller 302 to communicate with any cloud platform.

Node 310A and node 310B are two exemplary nodes that have been instantiated by daemon 314, and could be any node depicted along the content delivery chain. Node 310A and node 310B may each be communicatively coupled to GSLB 308 (as part of the enhanced name resolution discussed in FIG. 6), so that requests may be properly routed to each of the nodes. Node 310A and node 310B may each be further communicatively coupled to daemon 314. Each node can be configured as a standard domain name system (DNS) server, a standard hypertext transfer protocol (HTTP) server, or an enhanced node. If the node is configured as an enhanced node, the node can identify itself to GSLB 308 as a non-standard DNS server or a non-standard HTTP server, and provide additional metadata (e.g, current network conditions, precise location information, customer subscription level, node performance data, etc.) which allows GSLB 308 to provide additional responses (e.g., node performance data, alternate content locations, etc.).

Figure 4:
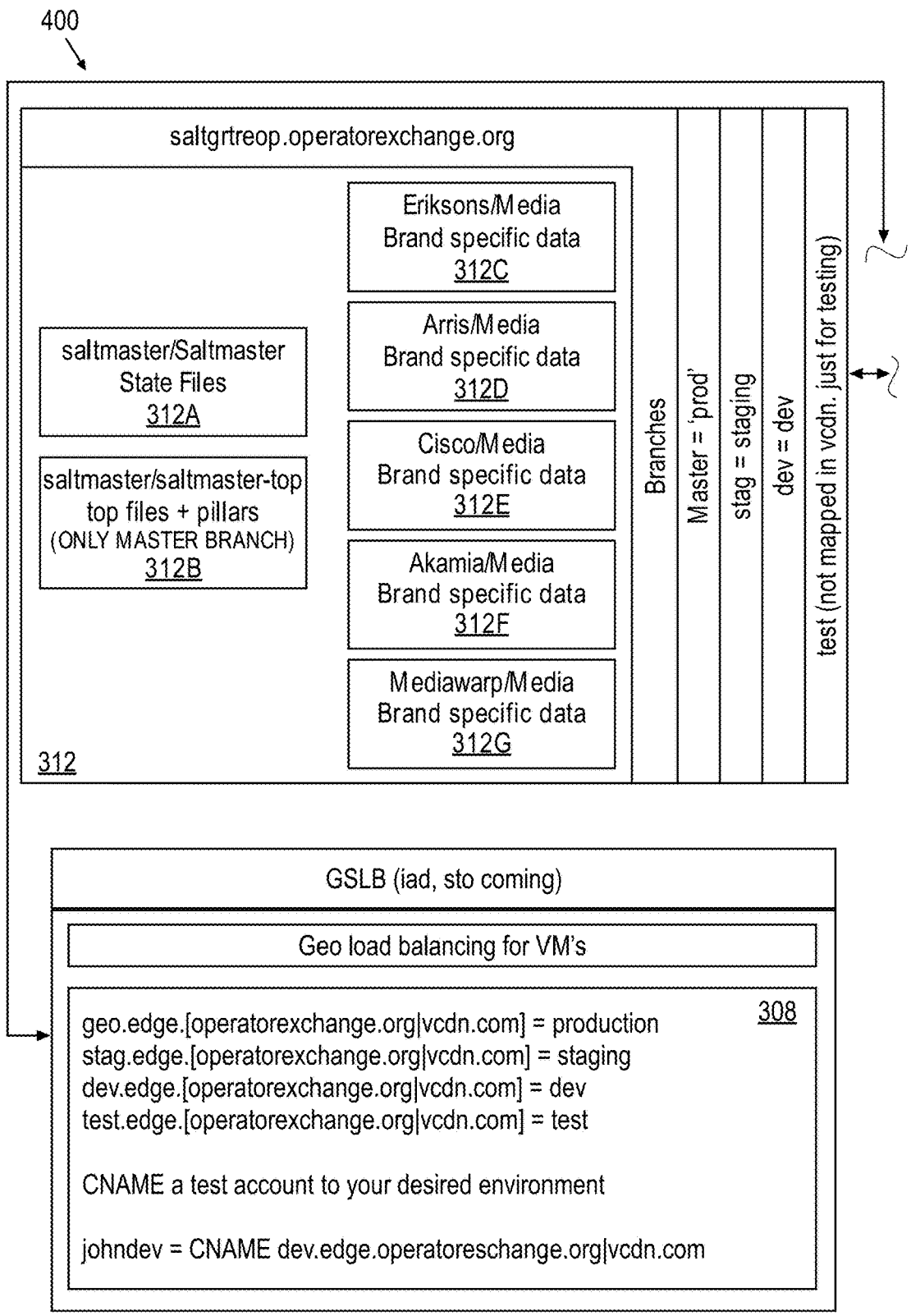
Figure 4:
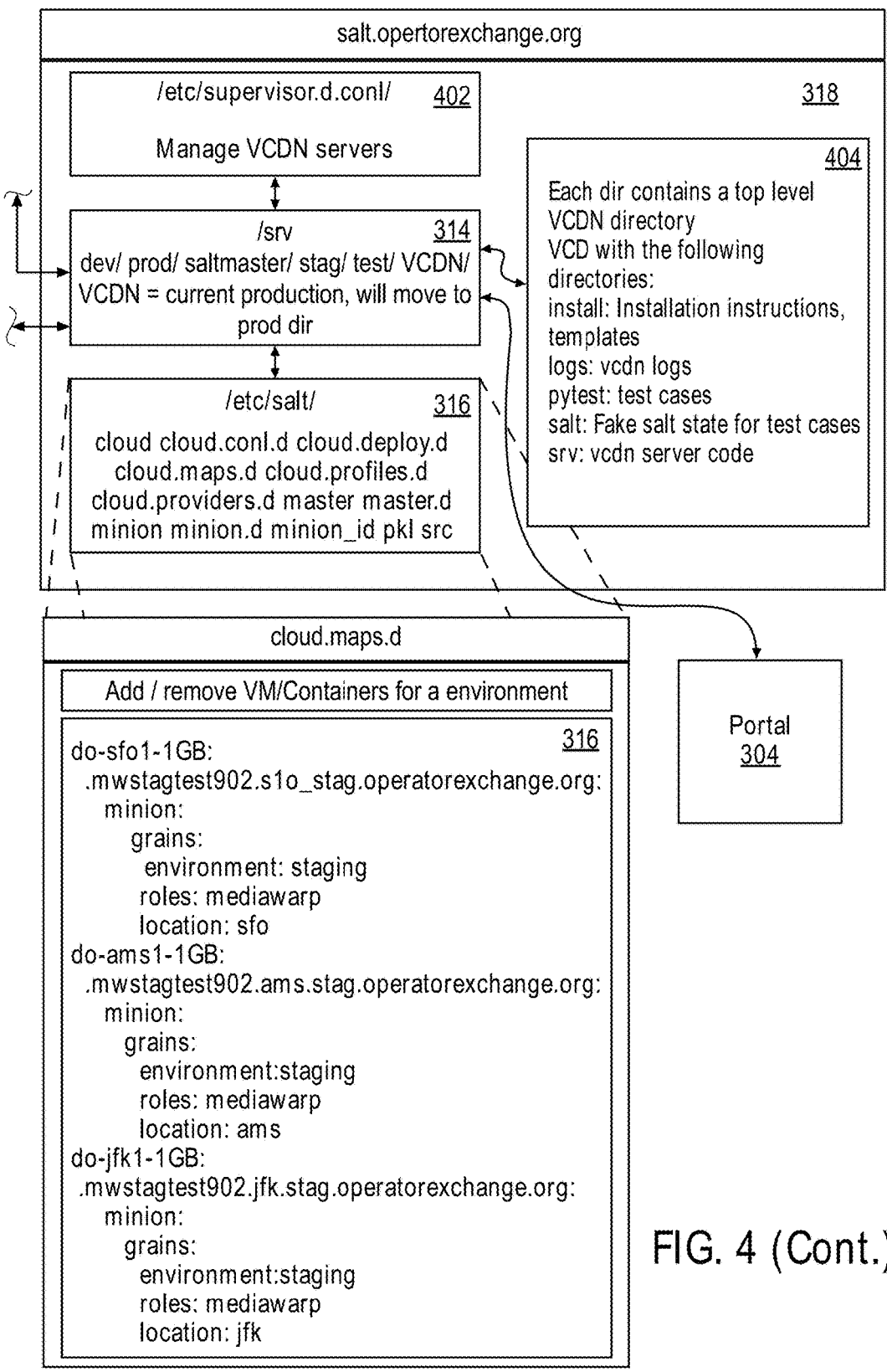

FIG. 4 depicts further details of the components of FIG. 3, in accordance with one embodiment of the invention. Repository 502 may generally define the VCDN. Within repository 312 may be repositories 312A and 312B containing packaging information as well as metadata which can drive how packages are built out. For example, metadata can indicate the type of platform on which the VCDN is being built (e.g., windows, Ubuntu, etc.), and the environment within which the VCDN is being built (e.g., production, staging, development, test, etc.). Within repository 312 may be repositories 312C-312G for holding the data of different customers (e.g., content provider or network operator), and each of repositories 312C-312G may be mapped to different nodes. In short, repositories either hold data, configuration/packaging information, and/or metadata that drives how the VCDN should be built out.

In FIG. 4, further details are provided for instantiation module 318. In addition to the previously described daemon 314 (which is responsible for creating the instances of the nodes) and map file 316 (which specifies among other things where the nodes should be instantiated), instantiation module 318 may also include watchdog 402 which makes sure the servers (e.g., the VCDN nodes) are running Instantiation module 318 may also include annotated comments 404 which provides further details of daemon 314. For example, within each of the directories of daemon 314 (e.g., one directory for each of the environments of development, production, staging, test, etc.), there may be an installation directory, a logs directory, a testing framework, etc.

In FIG. 4, an example map file is provided indicating that a VCDN node should be instantiated in San Francisco (i.e., IATA code=SFO) on a staging environment and with the role of a MediaWarp™ server; a VCDN node should be instantiated in Amsterdam, Netherlands (i.e., IATA code=AMS) on a staging environment and with the role of a MediaWarp server; and a VCDN node should be instantiated in New York City (i.e., IATA code=JFK) on a staging environment and with the role of a MediaWarp server.

To provide some context, system 300 may be viewed as an "end-to-end solution" (i.e., capable of constructing a content delivery network all the way from origin server 102 to the network leading up to end user devices 112A-112P) which provides a managerial overview to what has been a very disjoint build-out of networks. In the past, networks have evolved to serve particular needs, as opposed to being architected from a strategic view. What this does is to allow someone (e.g., content provider, network operator, etc.) to impose a strategy over those networks. Rather than having to construct solutions that deliver a particular kind of content, a particular security requirement, a particular latency requirement, etc., one can simply provision particular types of nodes as needed when needed.

Figure 5A:
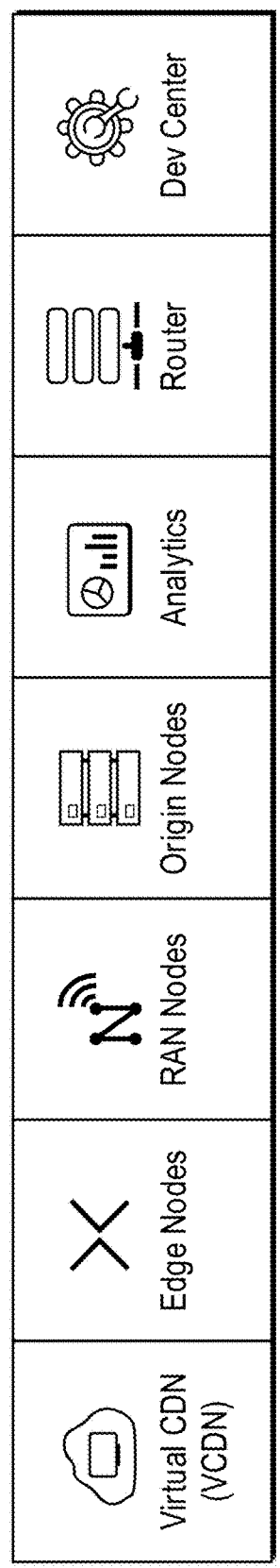
FIGS. 5A-5U depict screenshots of a web portal for configuring a content delivery network, in accordance with one embodiment of the invention.
Figure 5B:
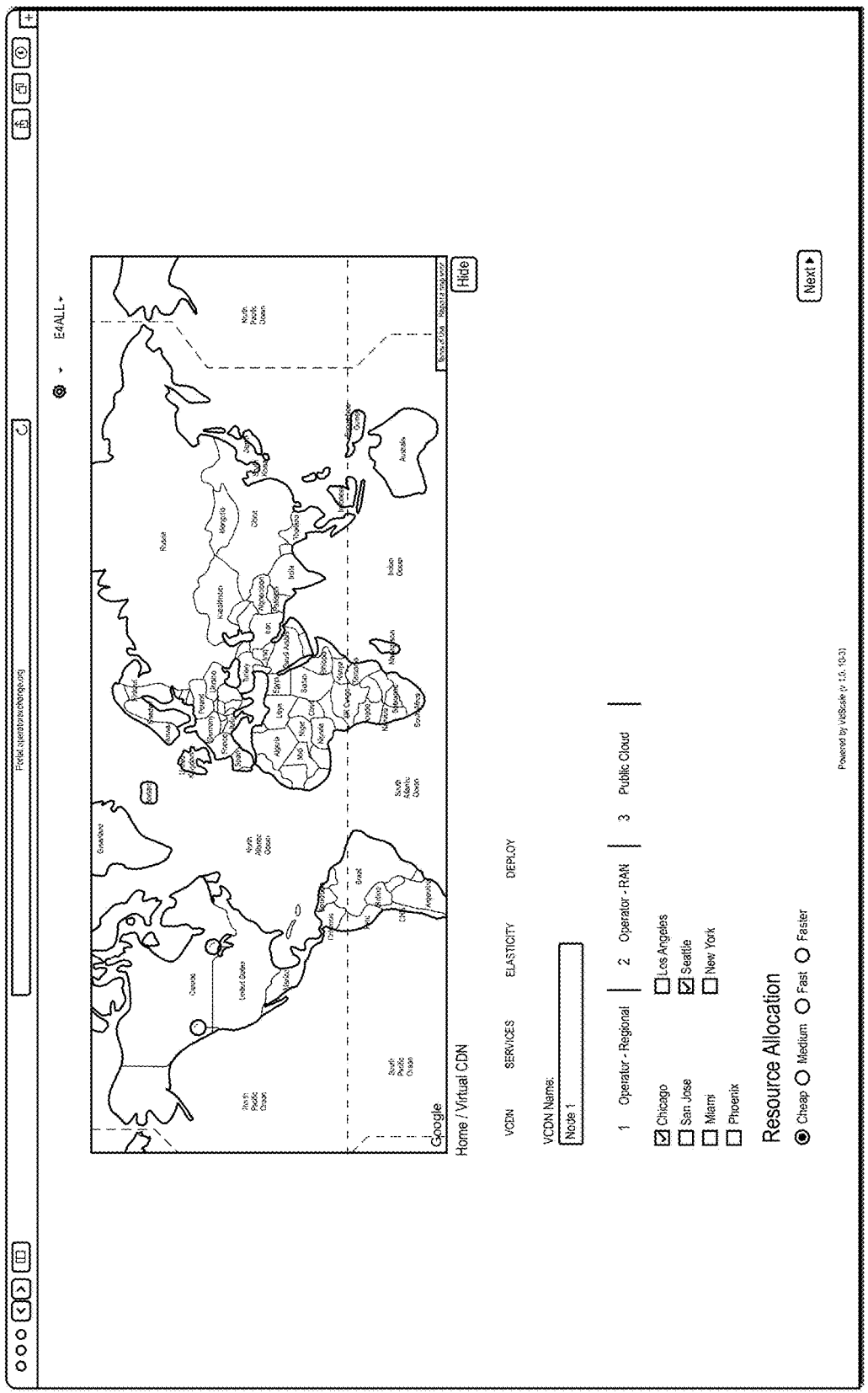
Figure 5C:
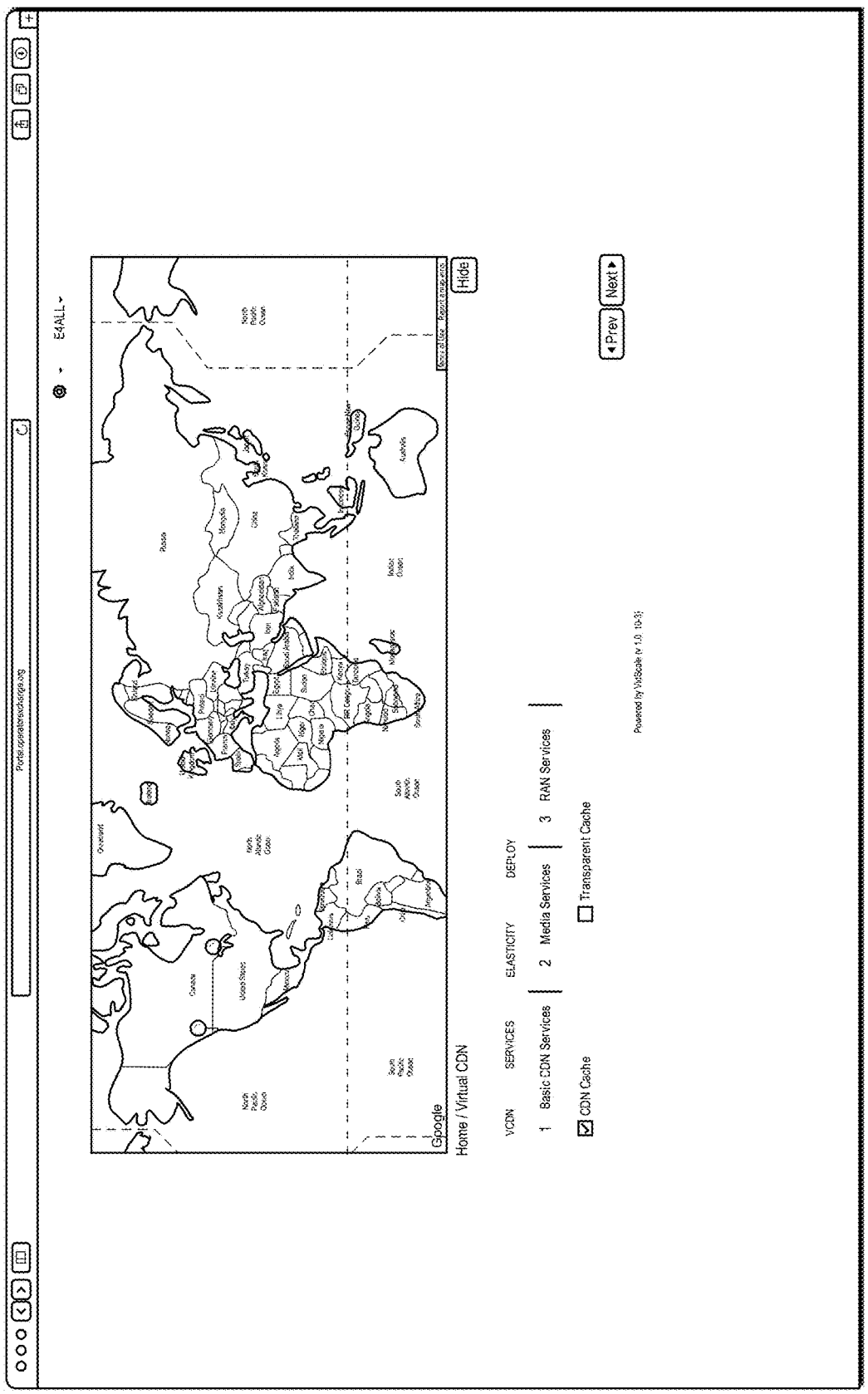
Figure 5D:
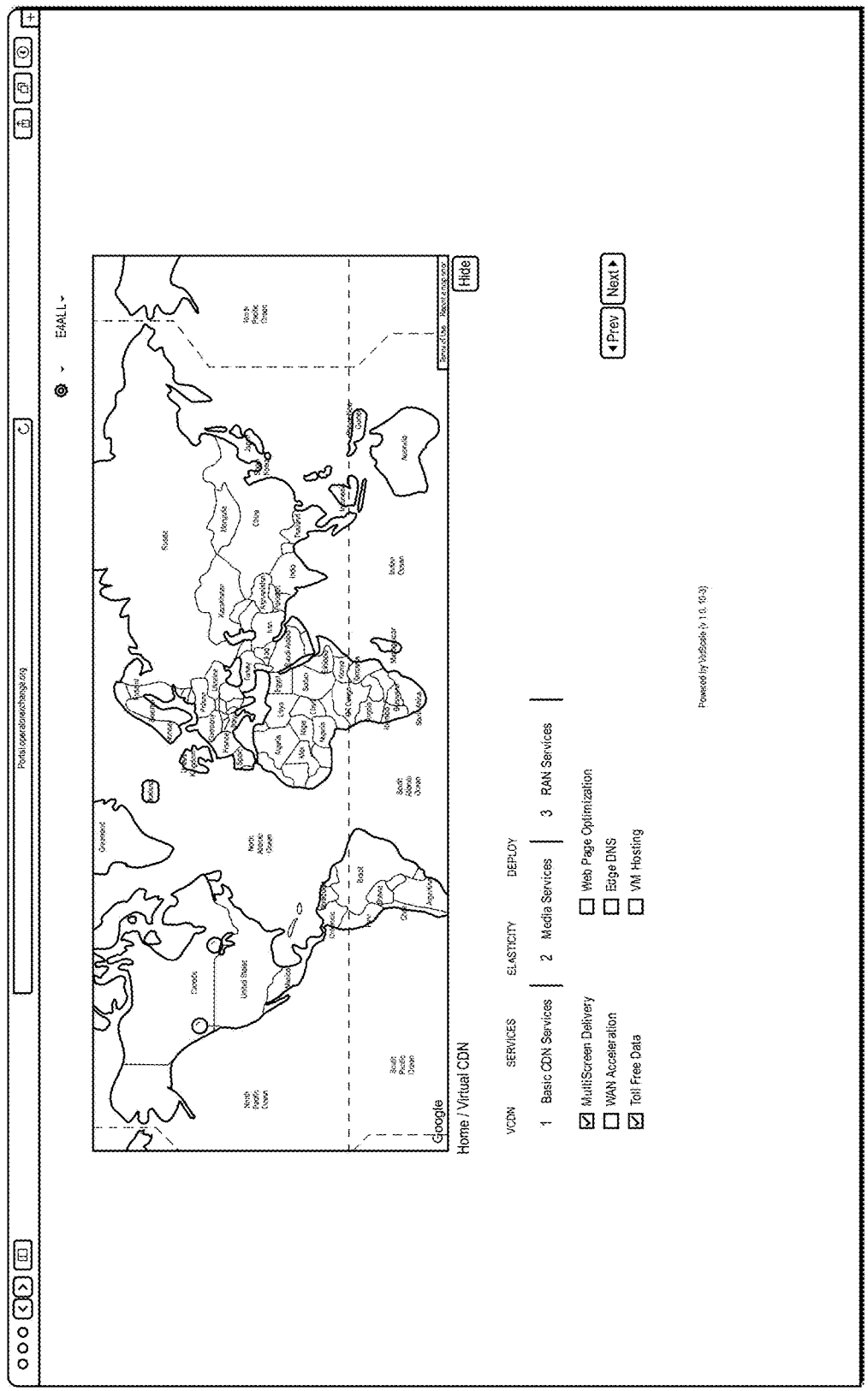
Figure 5E:
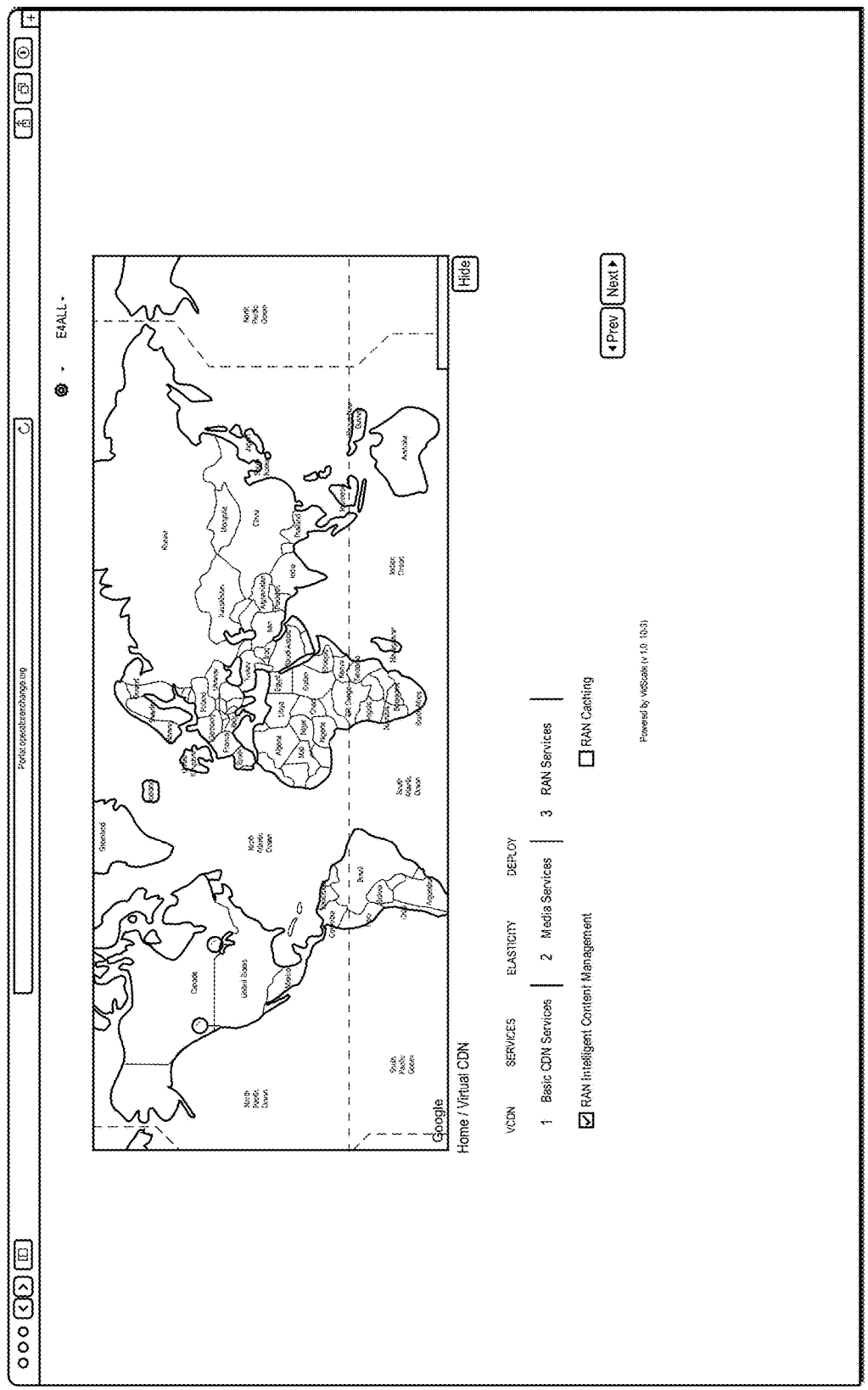
Figure 5F:
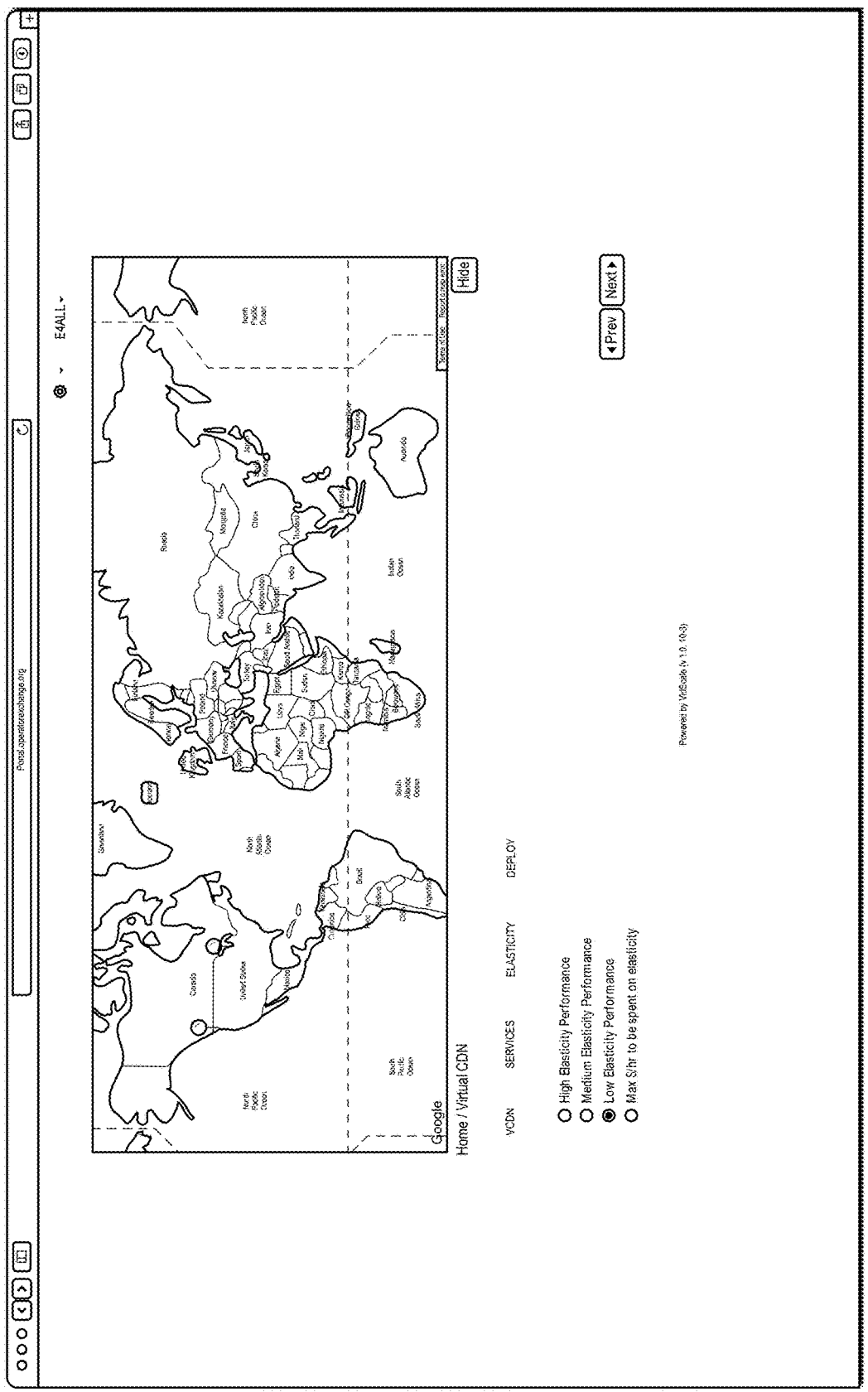
Figure 5G:
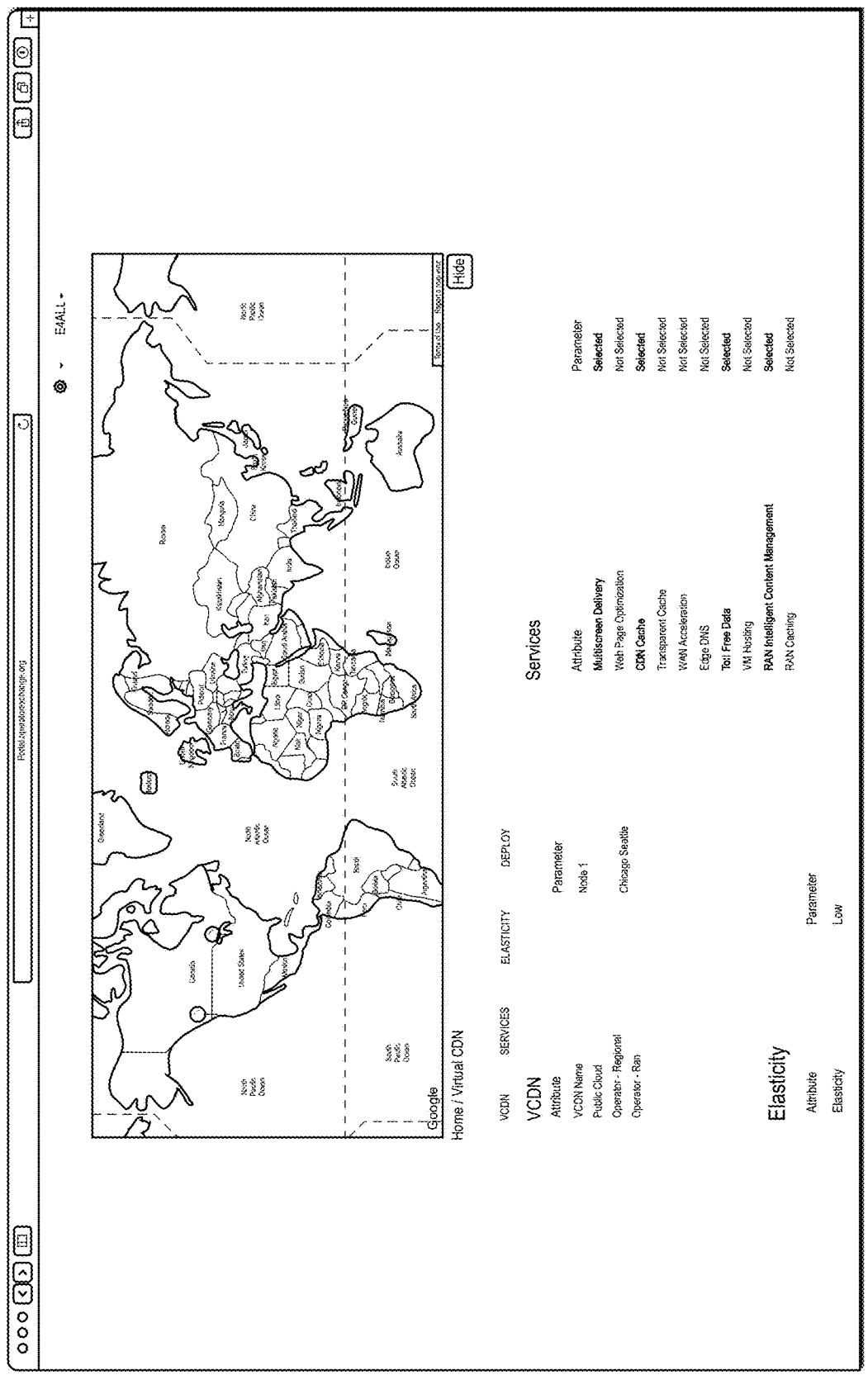
Figure 5H:
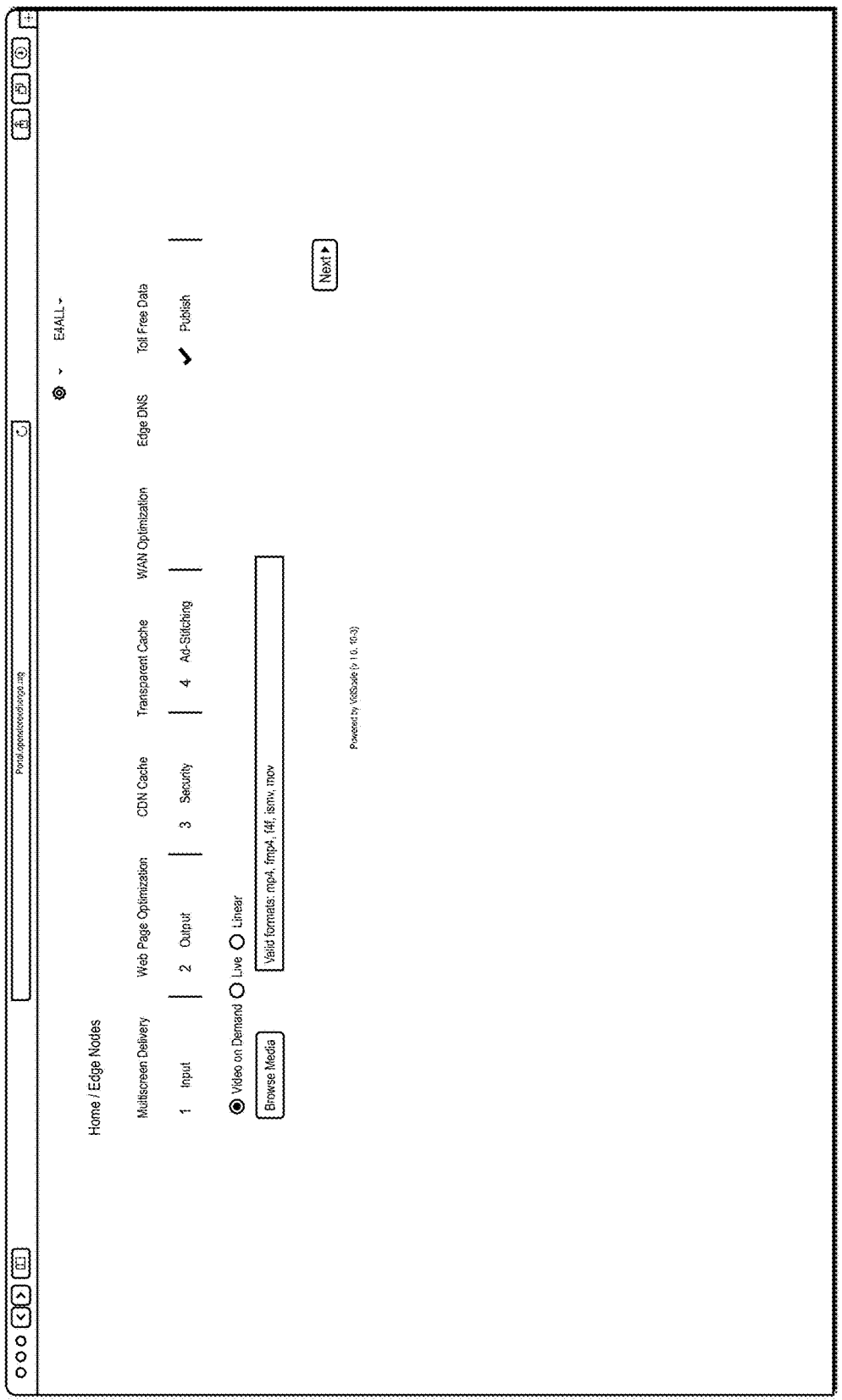
Figure 5I:
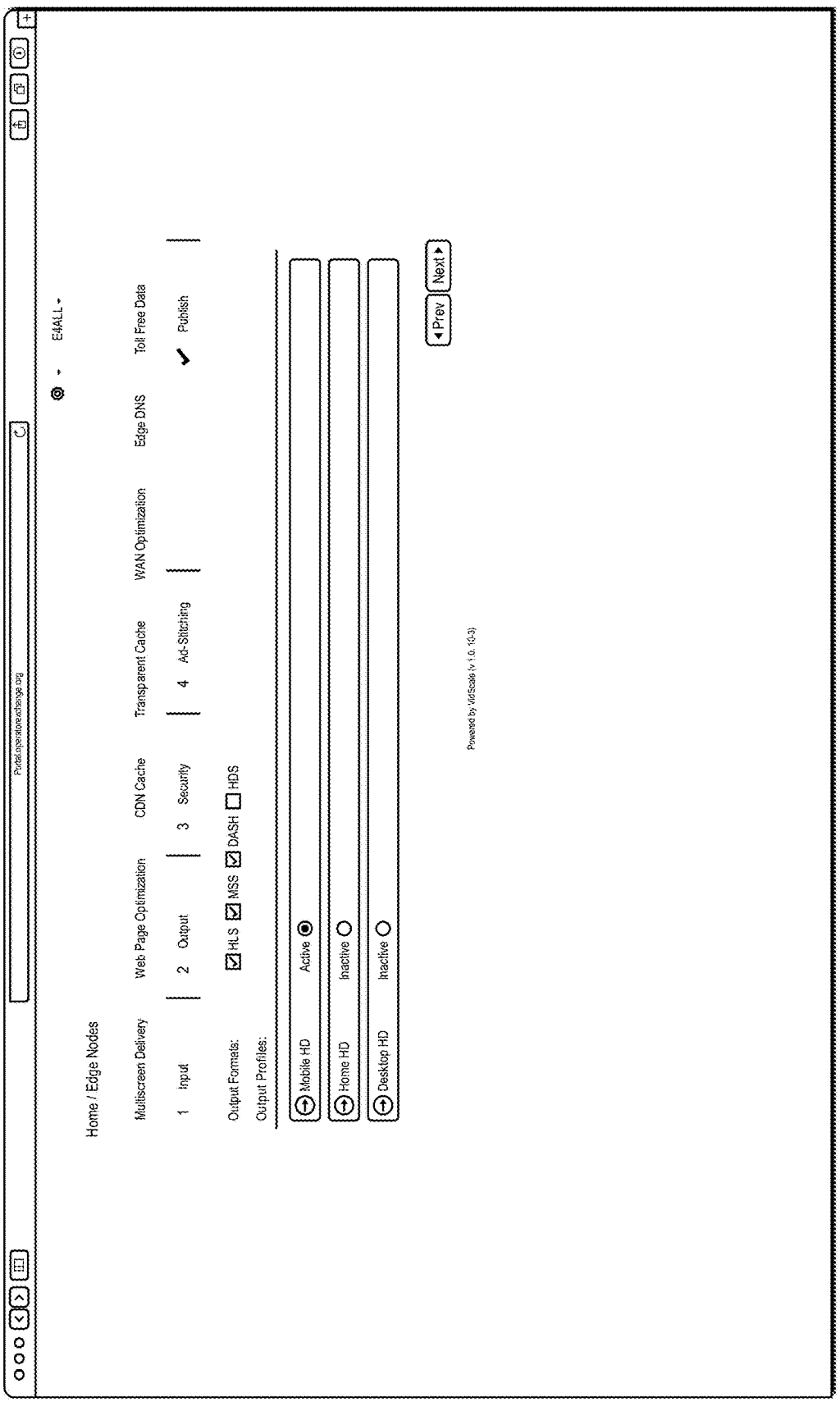
Figure 5J:
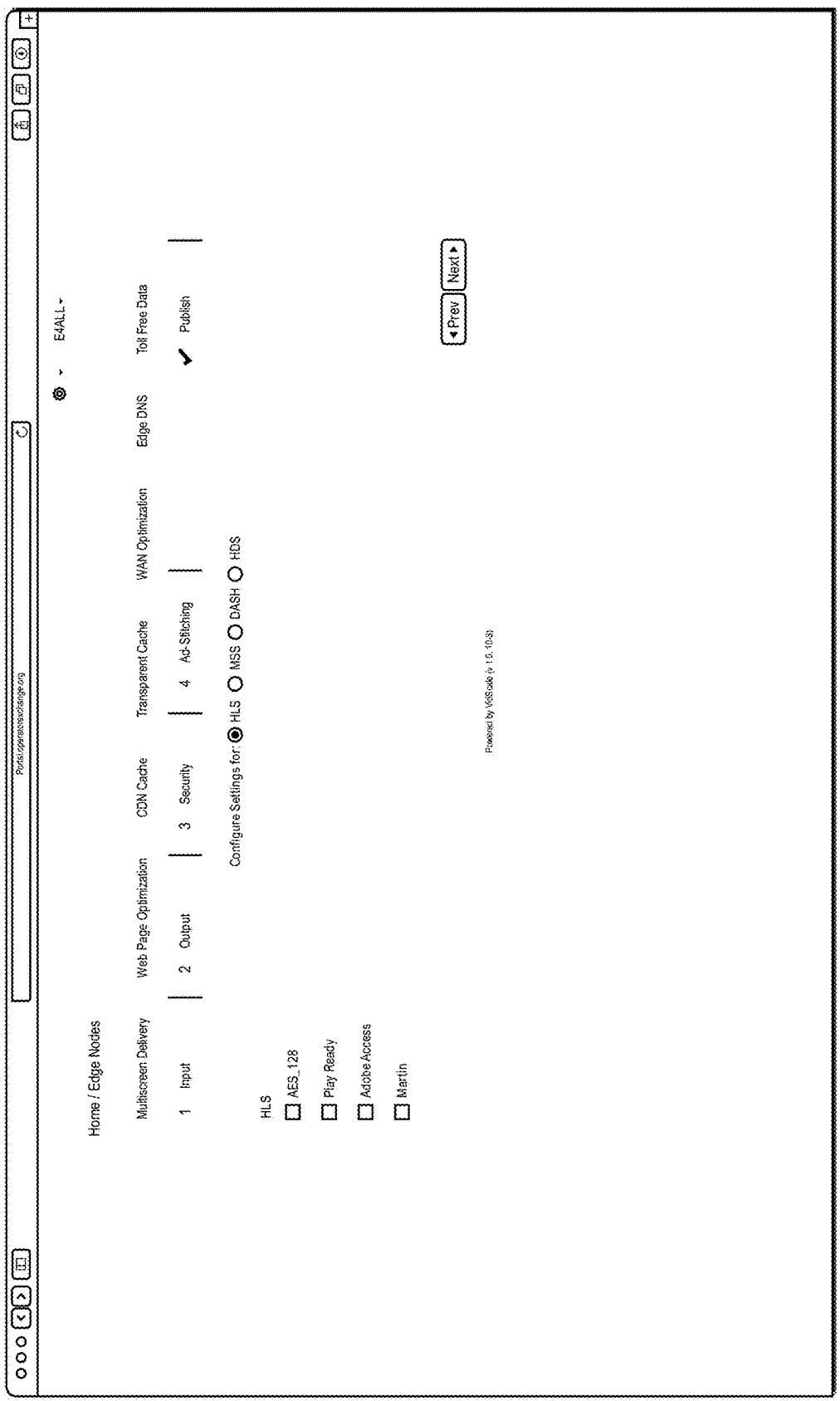
Figure 5K:
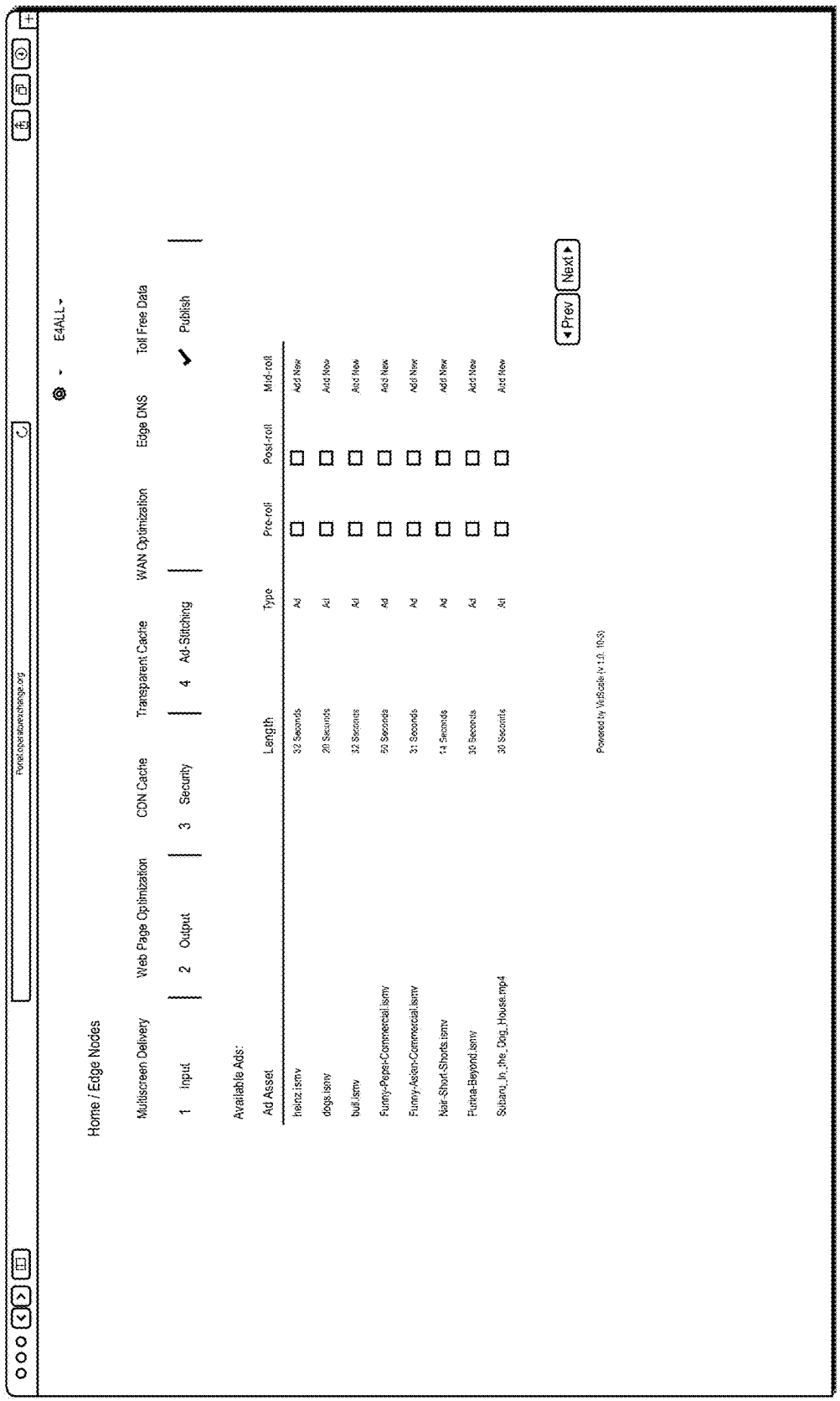
Figure 5L:
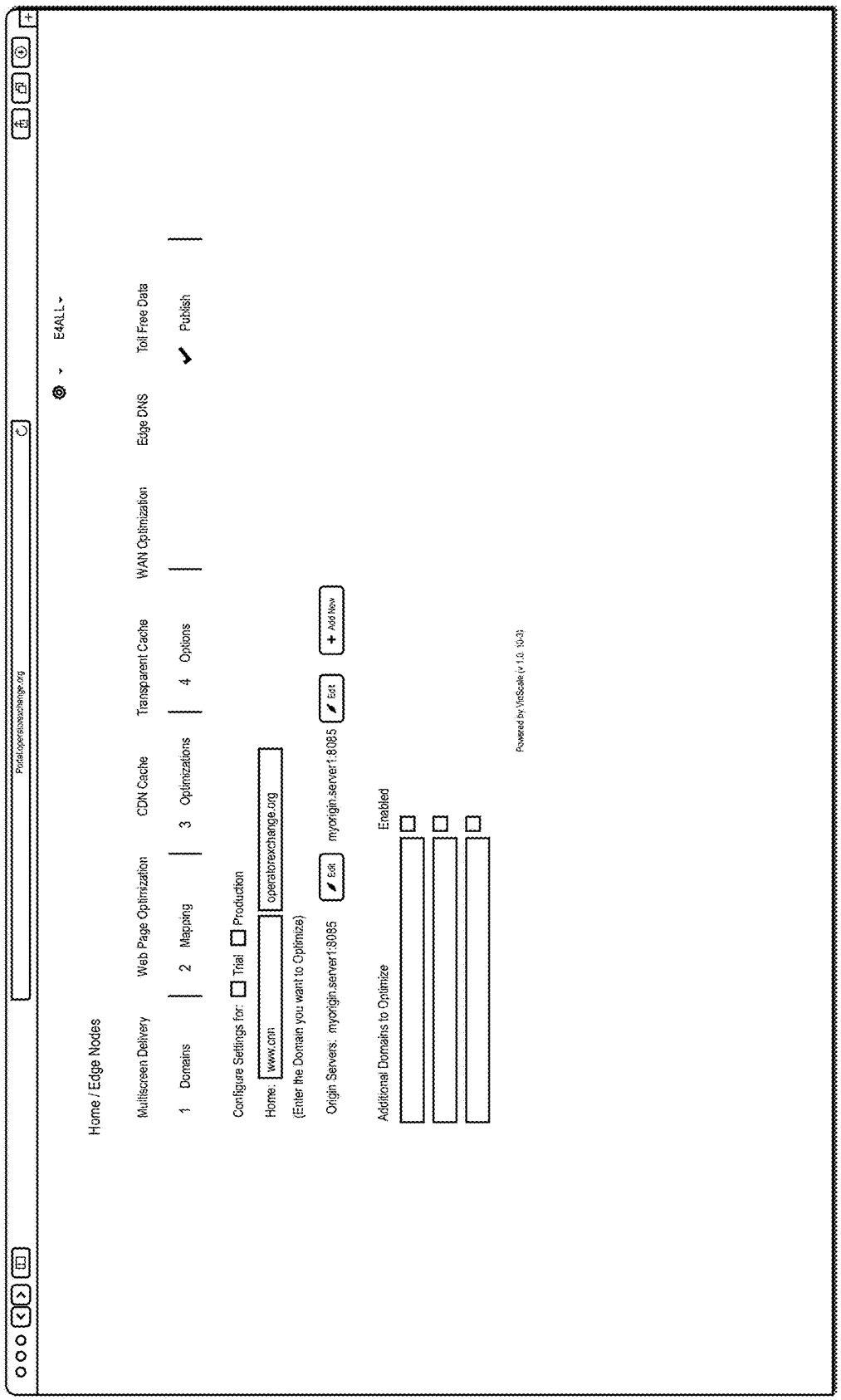
Figure 5M:
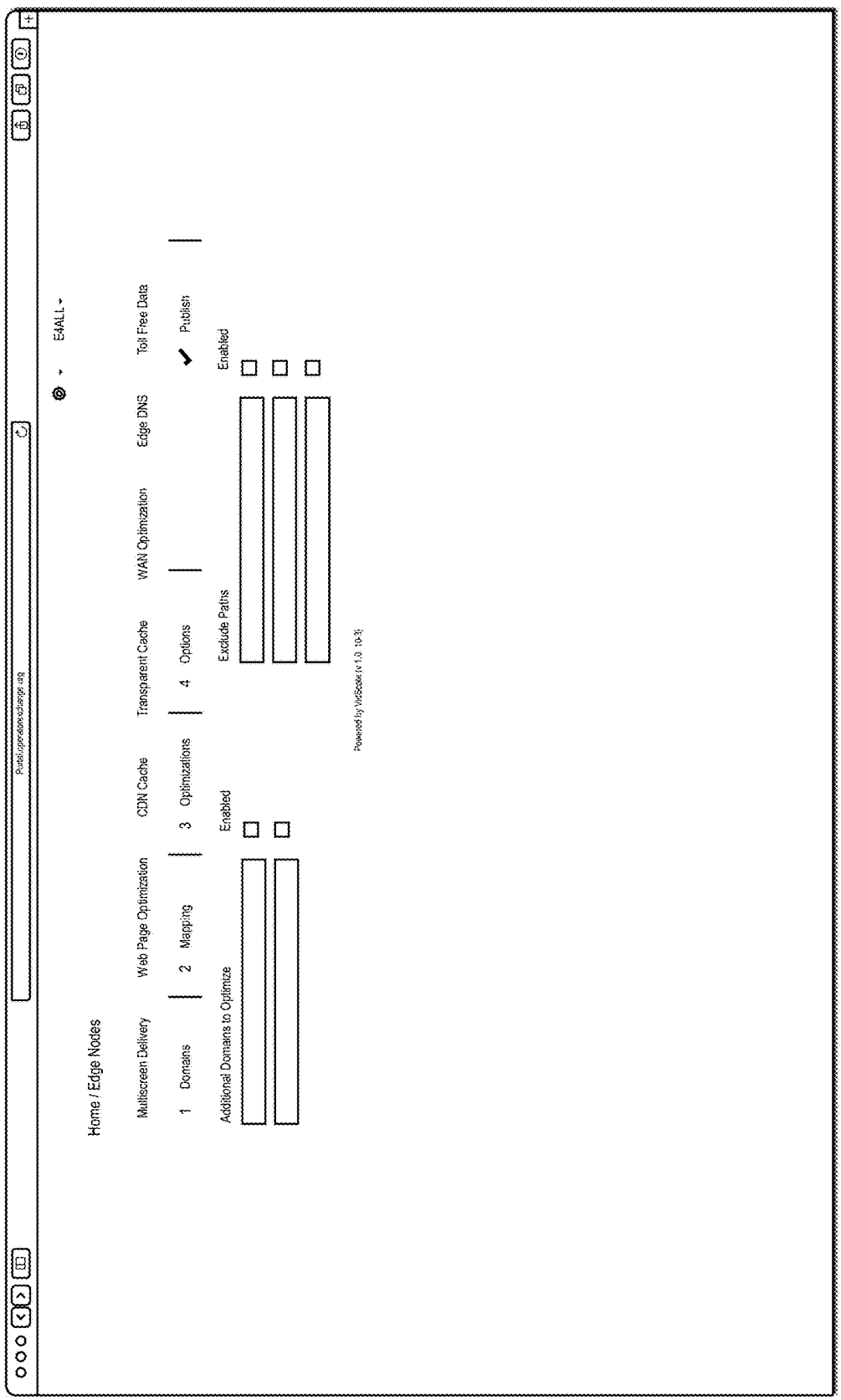
Figure 5N:
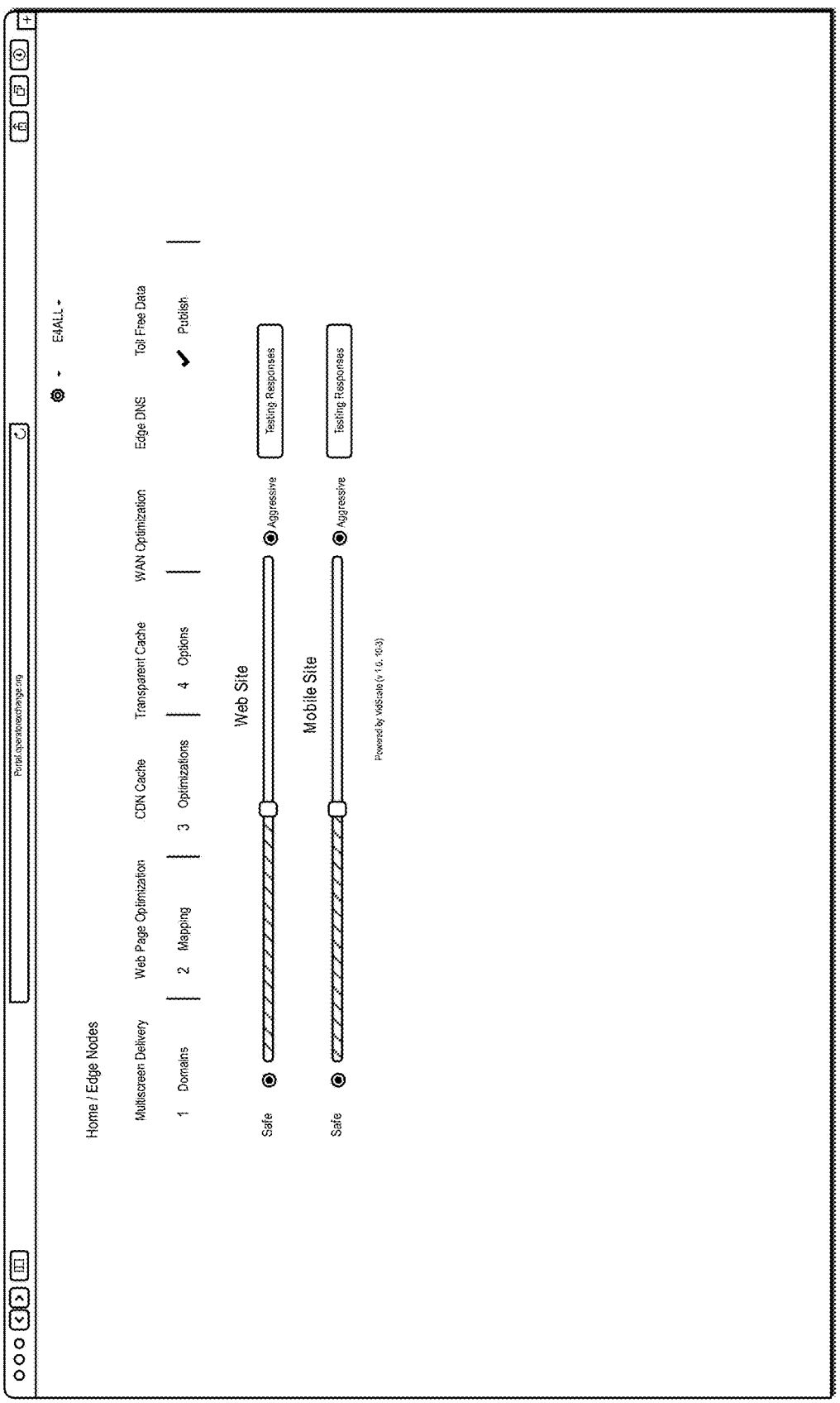
Figure 50:
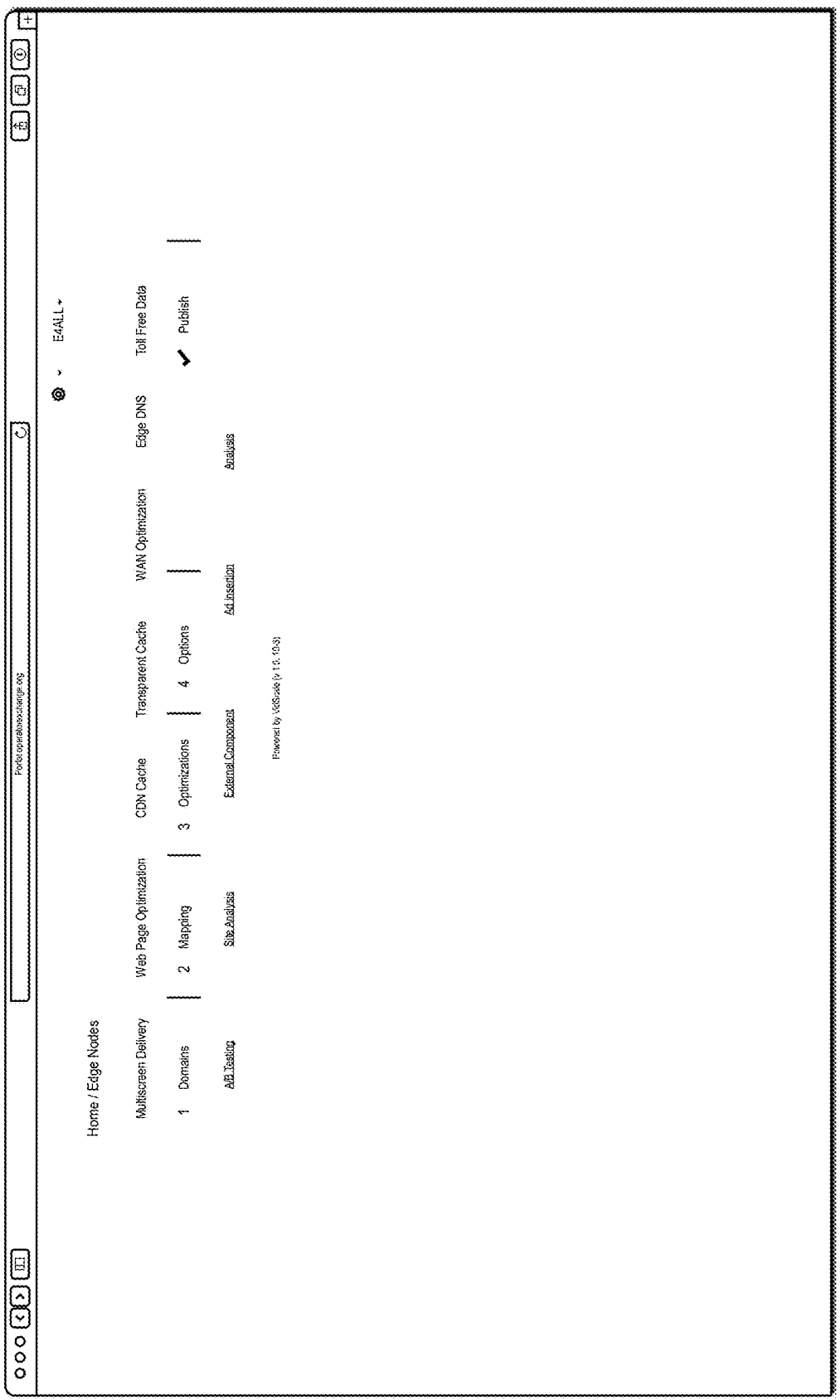
Figure 5P:
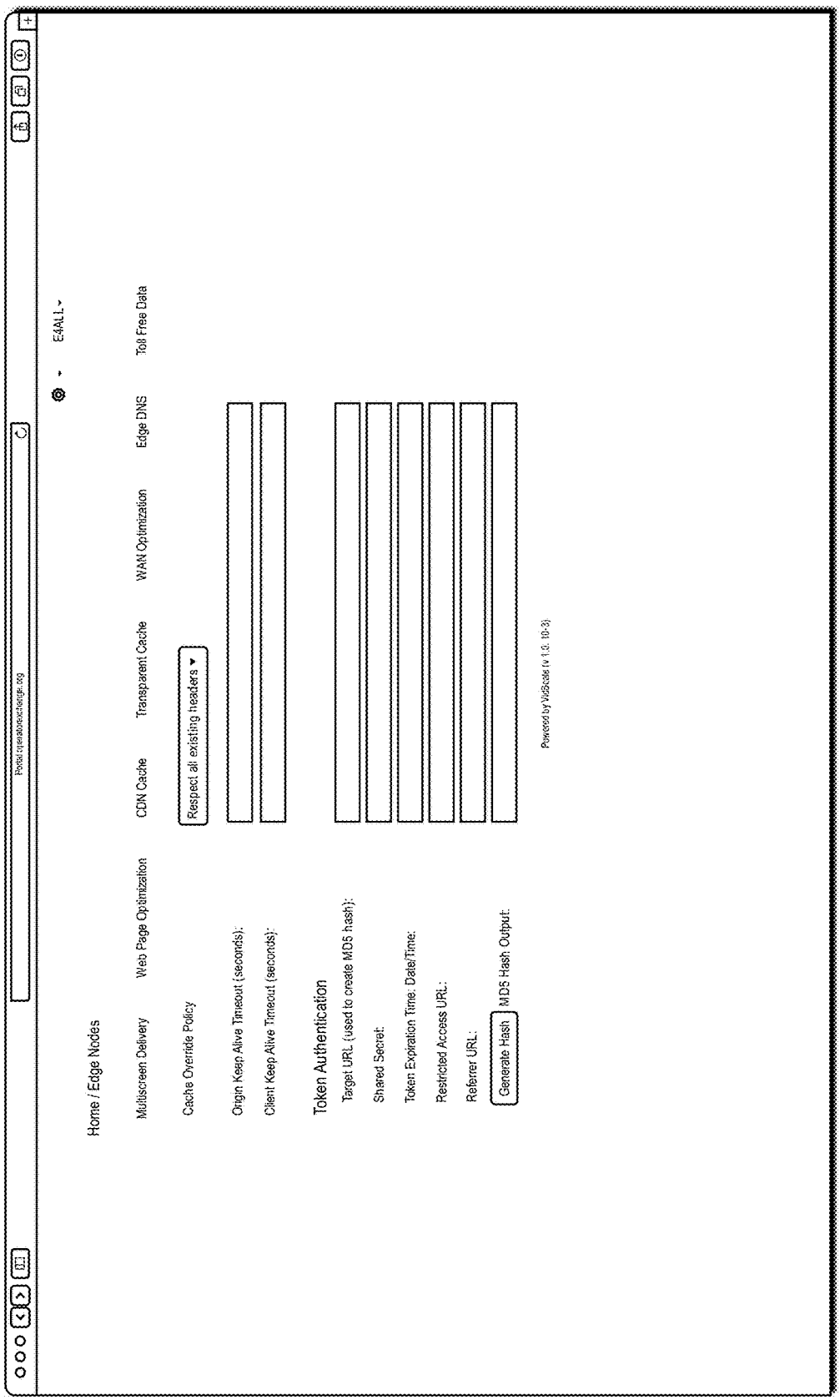
Figure 5Q:
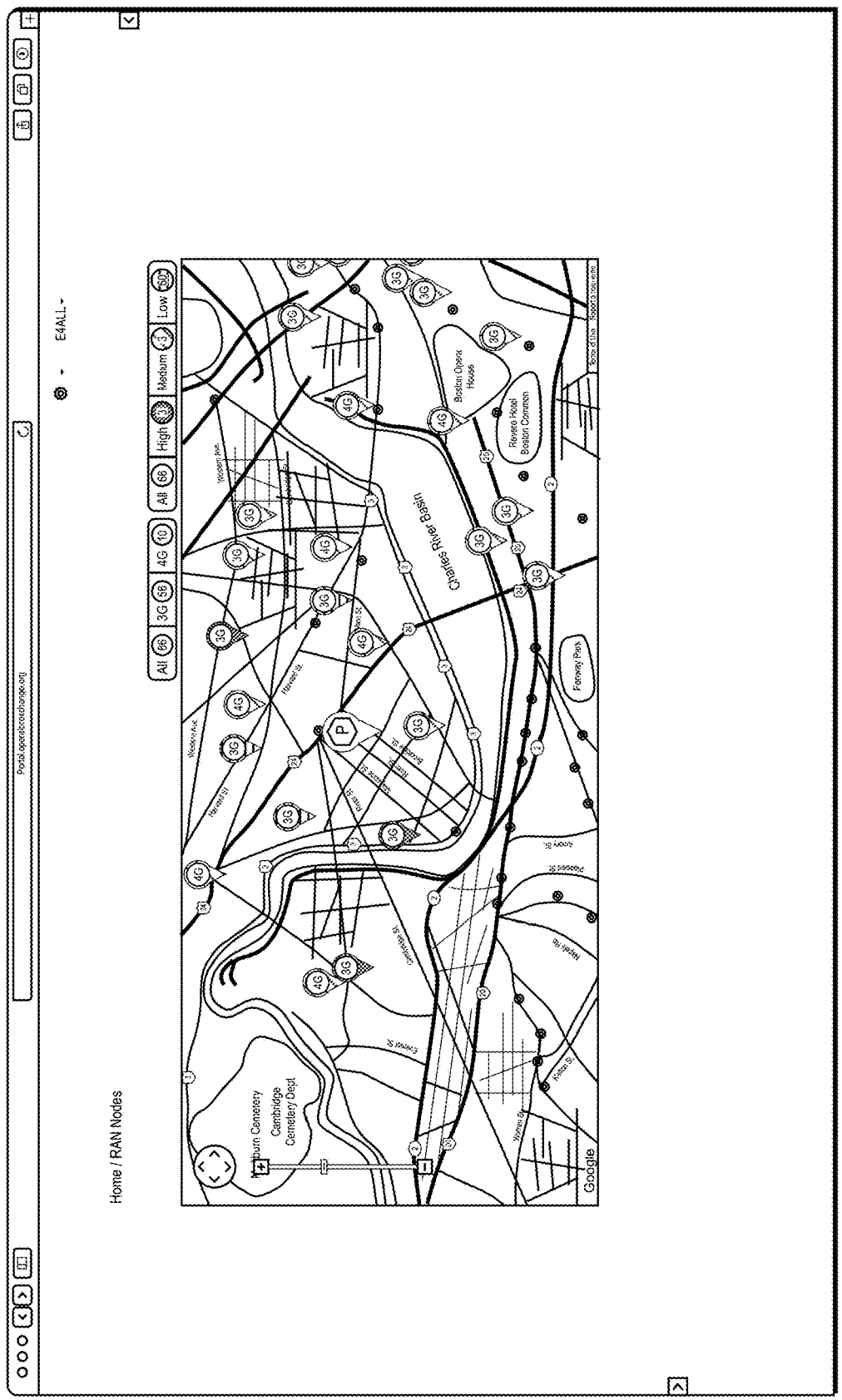
Figure 5R:
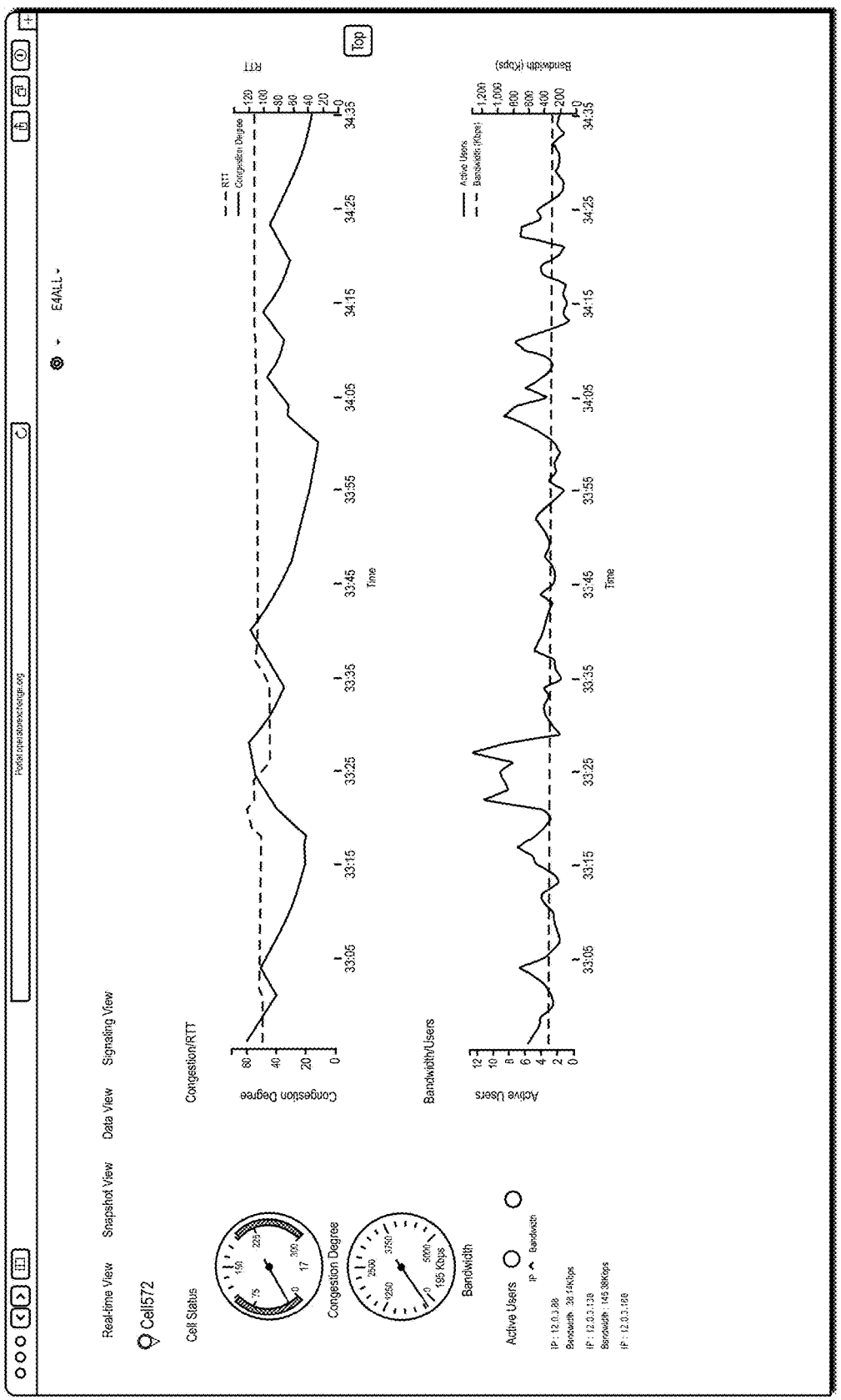
Figure 5S:
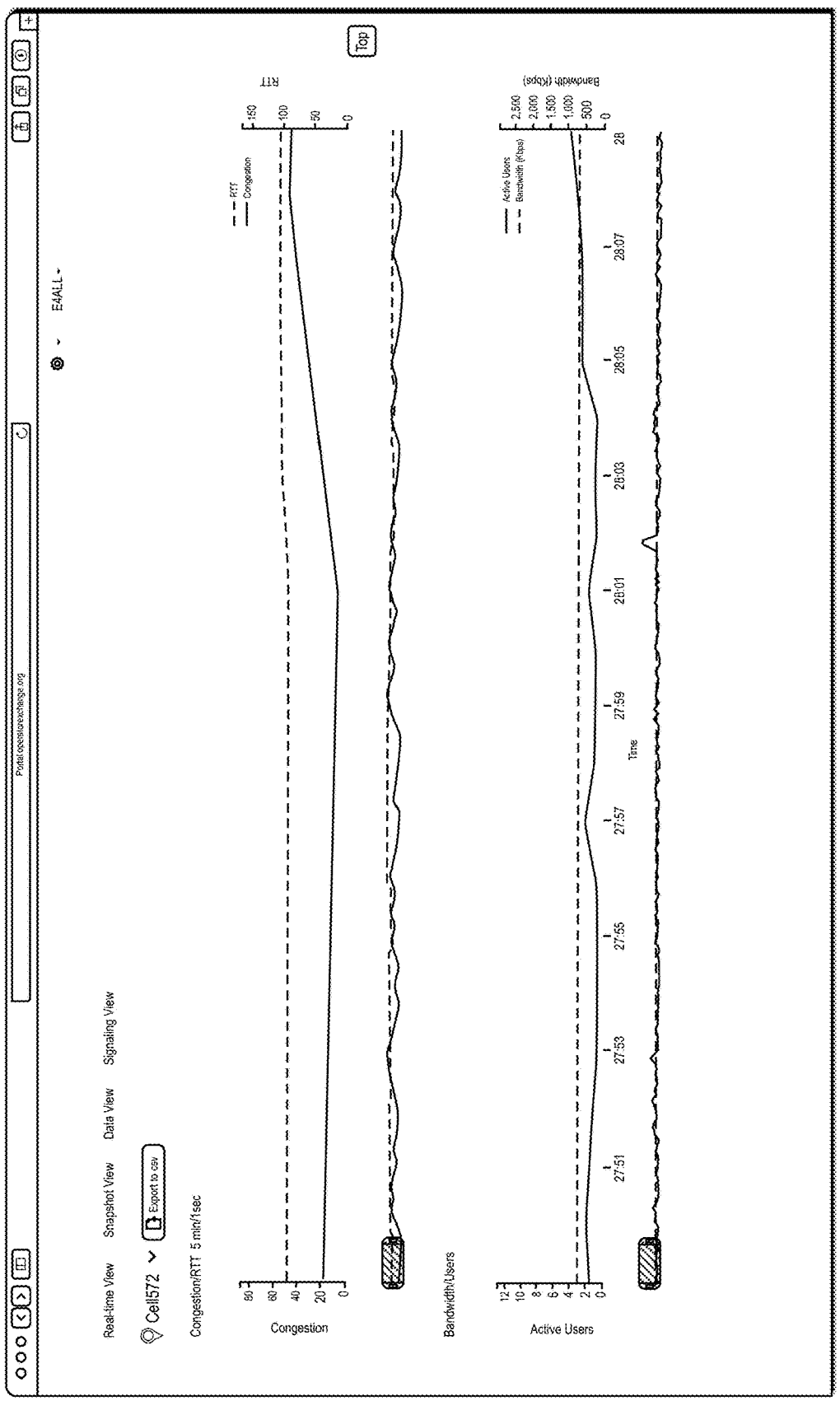
Figure 5T:
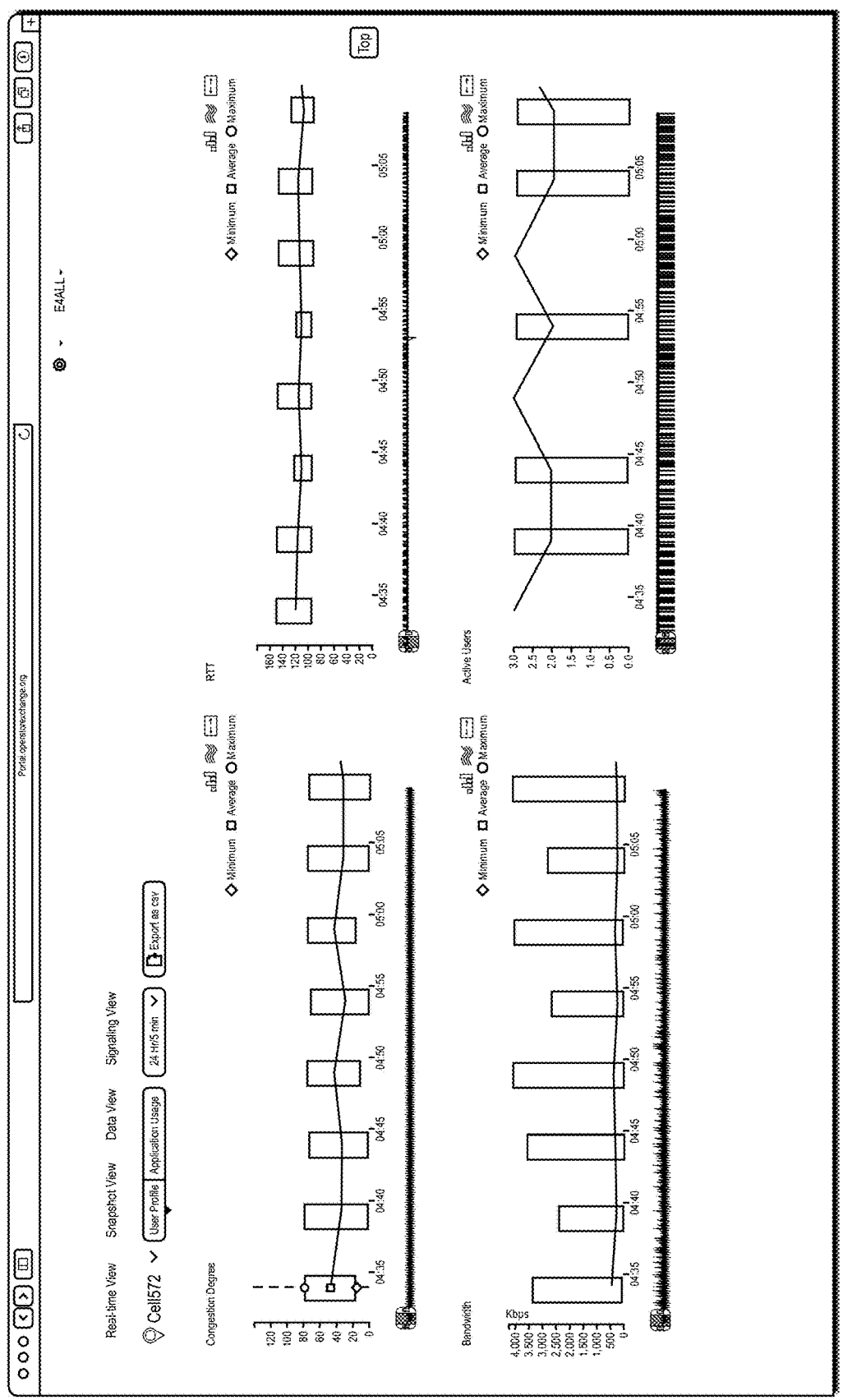
Figure 5U:
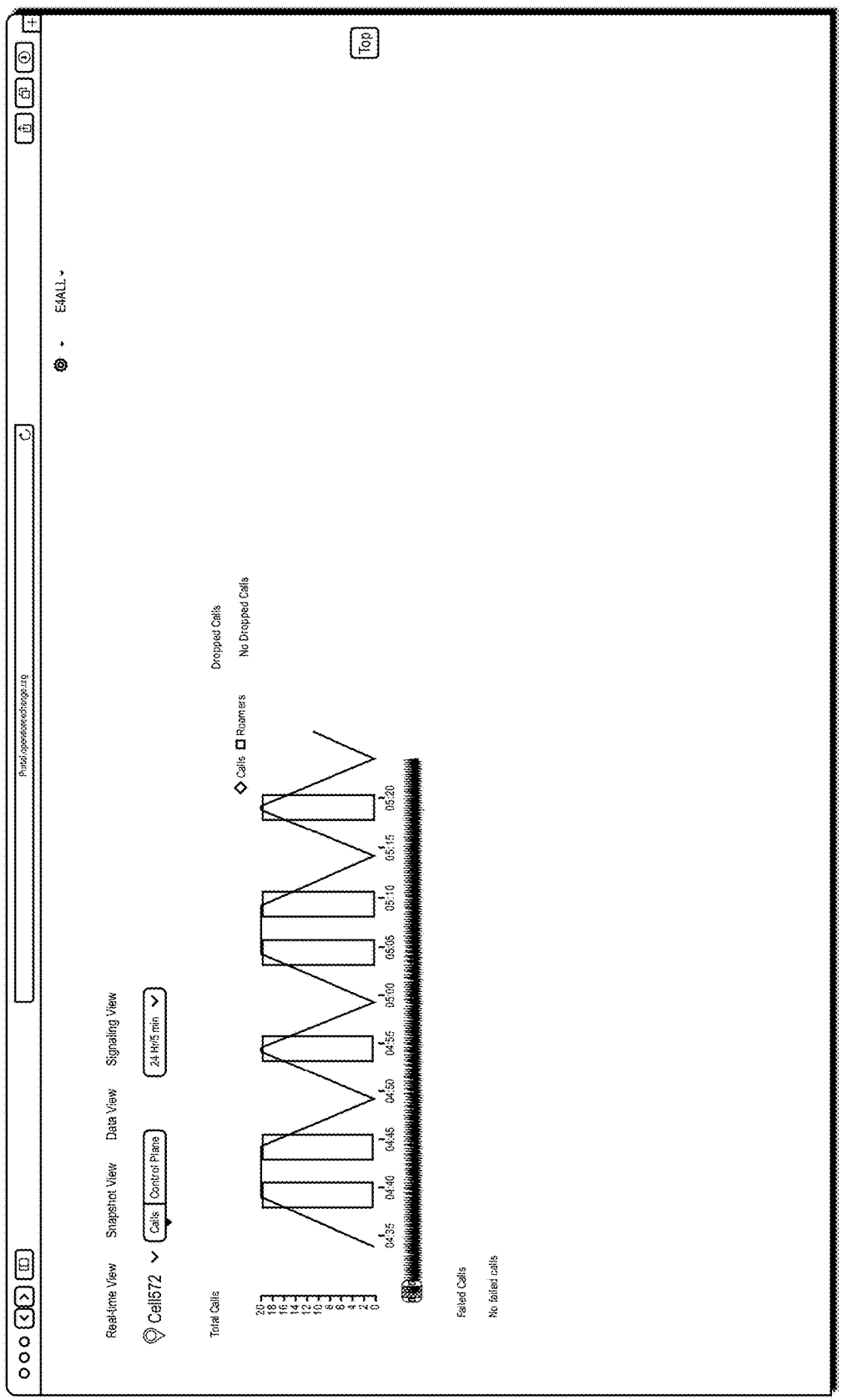

FIGS. 5A-5U depict screenshots of web portal 304 for configuring the end-to-end solution, in accordance with one embodiment of the invention. As depicted in the screenshot of FIG. 5A, a content provider may be provided with the option of configuring and deploying a virtual CDN (e.g., a process for routing and/or caching content from an origin server, the process running on a cloud computing platform). The content provider may also be provided with the option of configuring and deploying edge nodes (e.g., a process for routing and/or caching content from the virtual CDN, the process running on a cloud computing platform). The content provider may also be provided with the option of configuring and deploying radio access networks (RAN) nodes (e.g., a process for routing and/or caching content from edge nodes, the process running in a cloud computing platform). The content provider may also be provided with the option of configuring and deploying origin nodes (e.g., a process for storing and providing content, the process running on a cloud computing platform). The content provider may also be provided with the option of viewing analytics of the content delivery network that has been deployed (e.g., average latency of a request, etc.). The content provider may also be provided with the option of configuring and deploying a router. The content provider may also be provided with the option of accessing a development center, which provides development recommendations for a content provider and access to third-party applications the content provider can use when designing and deploying a service.

FIG. 5B depicts a screenshot of a user interface which may be presented to the content provider upon selection of the "Virtual CDN (VCDN)" icon in the user interface of FIG. 5A. In this user interface, the content provider may provide a name for the VCDN. In the present example, the name of "Node 1" has been assigned to the VCDN. The content provider may select whether the VCDN is to be instantiated in a regional network of an operator, a RAN of an operator and/or in a public cloud. Upon selection of the "Operator—Regional" option, the content provider may select cities of the regional network within which the VCDN is to be instantiated. In the present example, the cities of Chicago and Seattle have been selected, and pins may be placed on map to visually indicate such selection of the content provider. Upon selection of the "Operator—RAN" option, the content provider may likewise select cities of the RAN network within which the VCDN is to be instantiated (not depicted). Upon selection of the "Public Cloud" option, the content provider may likewise select cities of the public cloud within which the VCDN is to be instantiated (not depicted). The content provider may additionally select the level of resource allocation for the VCDN, whether it should be cheap, medium, fast, or faster. In the present example, the resource allocation of cheap has been selected. In an advanced configuration screen (not depicted), instead of being presented with the options of cheap, medium, fast and faster, the content provider may be presented with a list of server pricing options and allowed to select a specific server.

FIG. 5C depicts a screenshot of a user interface which may be presented to the content provider upon selection of the "SERVICES" link in the user interface of FIG. 5B. In this user interface, the content provider may configure the services of the VCDN, more particularly basic CDN services, media services and/or RAN services of the VCDN. Upon selection of the "Basic CDN Services" link, the content provider may be presented with the options of configuring the VCDN with the basic CDN service of a CDN cache and/or a transparent cache. In the present example, the option of CDN cache has been selected.

FIG. 5D depicts a screenshot of a user interface which may be presented to the content provider upon selection of the "Media Services" link in the user interface of FIG. 5C. In this user interface, the content provider may be presented with the options of configuring the VCDN with the media services of multiscreen delivery, WAN acceleration, toll free data, web page optimization, edge DNS and/or virtual machine (VM) hosting. In the present example, the options of multiscreen delivery and toll free data have been selected.

FIG. 5E depicts a screenshot of a user interface which may be presented to the content provider upon selection of the "RAN Services" link in the user interface of FIG. 5D. In this user interface, the content provider may be presented with the options of configuring the VCDN with the RAN service of RAN intelligent content management and/or RAN caching. In the present example, the option of RAN intelligent content management has been selected.

FIG. 5F depicts a screenshot of a user interface which may be presented to the content provider upon selection of the "ELASTICITY" link in the user interface of FIG. 5E. In this user interface, the content provider may be allowed to configure the elasticity of the VCDN, whether the VCDN should have high elasticity performance, medium elasticity performance, low elasticity performance, or a max $/hr to be spent on elasticity. In the present example, the option of low elasticity performance has been selected.

FIG. 5G depicts a screenshot of a user interface which may be presented to the content provider upon selection of the "DEPLOY" link in the user interface of FIG. 5F. In this user interface, the content provider may be provided with a summary of the configurations that the content provider has chosen for the VCDN. For example, for the attribute of "VCDN Name", the parameter of "Node 1" is displayed, for the attribute "Operator—Regional", the parameters "Chicago, Seattle" are displayed, and so on.

FIG. 5H depicts a screenshot of a user interface which may be presented to the content provider upon selection of the "Edge Nodes" icon in the user interface of FIG. 5A. In this user interface, the content provider may configure the input of the multiscreen delivery of the edge nodes. The content provider may select whether the input should be video on demand, live and/or linear. In the present example, the input of video on demand has been selected. The content provider may also be provided with the option to upload media by selecting the "Browse Media" icon.

FIG. 5I depicts a screenshot of a user interface which may be presented to the content provider upon selection of the "2 Output" link in the user interface of FIG. 5H. In this user interface, the content provider may configure the output of the multiscreen delivery of the edge nodes. The content provider may select whether the output format should be HLS, MSS, DASH and/or HDS. In the present example, the output format of HLS, MSS and DASH have been selected. The content provider may also select whether the output profile should be mobile HD, home HD and/or desktop HD. In the present example, the option of mobile HD has been selected.

FIG. 5J depicts a screenshot of a user interface which may be presented to the content provider upon selection of the "3 Security" link in the user interface of FIG. 5I. In this user interface, the content provider may configure settings for the output formats that were selected in the user interface of FIG. 5I. For the output format of HLS, the content provider may select the settings of AES_128, play ready, Adobe access and/or Marlin. For the output format of MSS, the content provider may select the setting of play ready (not depicted). For the output format of DASH, the content provider may select the settings of play ready, Marlin and/or common encryption (not depicted). For the output format of HDS, the content provider may select the settings of Adobe access (not depicted).

FIG. 5K depicts a screenshot of a user interface which may be presented to the content provider upon selection of the "4 Ad Stitching" link in the user interface of FIG. 5J. In this user interface, the content provider may select ad assets which are to be stitched into the uploaded media. For example, the content provider may select the ad assets of "Heinz.ismv" which has a length of 32 seconds, "dogs.ismv" which has a length of 20 seconds, etc. For each of the ad assets, the content provider may select whether the ad asset is to be stitched pre-roll, post-roll and/or mid-roll.

FIG. 5L depicts a screenshot of a user interface which may be presented to the content provider upon selection of the "Web Page Optimization" link in the user interface of FIG. 5K. In this user interface, the content provider may select the domains for the web page optimization of the edge node. The content provider may select whether the domains should be configured for a trial and/or a production. The content provider may also input the home URL of the domain. In the present example, the home URL of www<dot>cnn<dot>operatorexchange<dot>org has been provided. The content provider may also input the origin servers of the domain. In the present example, the origin servers of myorigin.server1:8085 and myorigin.server1:8085 have been provided. The content provider may also input additional domains to optimize.

FIG. 5M depicts a screenshot of a user interface which may be presented to the content provider upon selection of the "Mapping" link in the user interface of FIG. 5K. In this user interface, the content provider may input additional domains to optimize, as well as input paths that should be excluded.

FIG. 5N depicts a screenshot of a user interface which may be presented to the content provider upon selection of the "Optimizations" link in the user interface of FIG. 5M. In this user interface, the content provider may be provided with a slide bar to select the degree to which a web site and/or mobile site should be optimized (e.g., degree to which the optimization should be safe or aggressive.)

FIG. 5O depicts a screenshot of a user interface which may be presented to the content provider upon selection of the "Options" link in the user interface of FIG. 4N. In this user interface, the content provider may be provided with the options of A/B testing, site analysis, external component, ad insertion and/or analysis.

FIG. 5P depicts a screenshot of a user interface which may be presented to the content provider upon selection of the "CDN Cache" link in the user interface of FIG. 5O. In this user interface, the content provider may specify the cache override policy (e.g., whether all existing headers should be respected, whether the cache override policy should apply after 1 minute, 5 minutes, etc.). The content provider may additionally specify the duration of the origin keep alive timeout in seconds and/or the duration of the client keep alive timeout in seconds. With respect to a token authentication, the content provider may specify a target URL (used to create a MD5 hash), a shared secret, a token expiration time (date/time), a restricted access URL and/or a referrer URL. Additionally, the content provider may be provided with the option to generate a hash as a MD5 hash output.

FIG. 5Q depicts a screenshot of a user interface which may be presented to the content provider upon selection of the "RAN Nodes" icon in the user interface of FIG. 5A. This user interface presents a map with the location of various RAN nodes labeled on the map. The nodes may be 3G or 4G nodes. Further, the traffic associated with the nodes may be indicated, whether high, medium or low. The content provider may select one or more of the RAN nodes to incorporate into the content delivery network that is being designed or configured.

FIG. 5R depicts a screenshot of a real-time view (i.e., that is being actively updated) of the traffic associated with the node that has been selected by the content provider in the user interface of FIG. 5Q (i.e., cell 572). The real-time view may depict the congestion degree, bandwidth and number of active users associated with the selected node. Further, the real-time view may depict a plot of the congestion and the round trip time (RTT) of the node over time. Further, the real-time view may depict a plot of the bandwidth and the number of users of the node over time.

FIG. 5S depicts a screenshot of a snapshot view (i.e., a static view of data used for analysis) of the traffic associated with the node that has been selected by the content provider in the user interface of FIG. 5Q (i.e., cell 572). The snapshot view may depict a plot of the congestion (e.g., time-averaged over a duration of 5 minutes, or a user configurable time scale) and the RTT (e.g., time-averaged over a duration of 1 second) of the node over time. Further, the real-time view may depict a plot of the bandwidth and the number of users of the node over time. An important part about the RAN integration is that network performance can be used to adjust the vCDN service in real-time. For example, when there is network congestion, a content provider can limit the quality of streaming video being offered, return lower quality images in a web page, set different network QoS bits, delay certain types of traffic, etc.

FIG. 5T depicts a screenshot of a data view of the traffic associated with the node that has been selected by the content provider in the user interface of FIG. 5Q (i.e., cell 572). The data view may depict a plot of the congestion degree of the node over time, including the minimum, average and maximum degree of congestion at each time. The data view may depict a plot of the RTT of the node over time, including the minimum, average and maximum RTT at each time. The data view may depict a plot of the bandwidth of the node over time, including the minimum, average and maximum bandwidth at each time. The data view may depict a plot of the number of active users of the node over time, including the minimum, average and maximum number of active users at each time.

FIG. 5U depicts a screenshot of a signaling view of the traffic associated with the node that has been selected by the content provider in the user interface of FIG. 5Q (i.e., cell 572). The signaling view may depict a plot of the total calls handled by the node over time, and whether any of these calls were from roamers. The signaling view may also indicate whether there were any dropped calls (in this instance there were none) and whether there were any failed calls (in this instance there were none).

Figure 6:
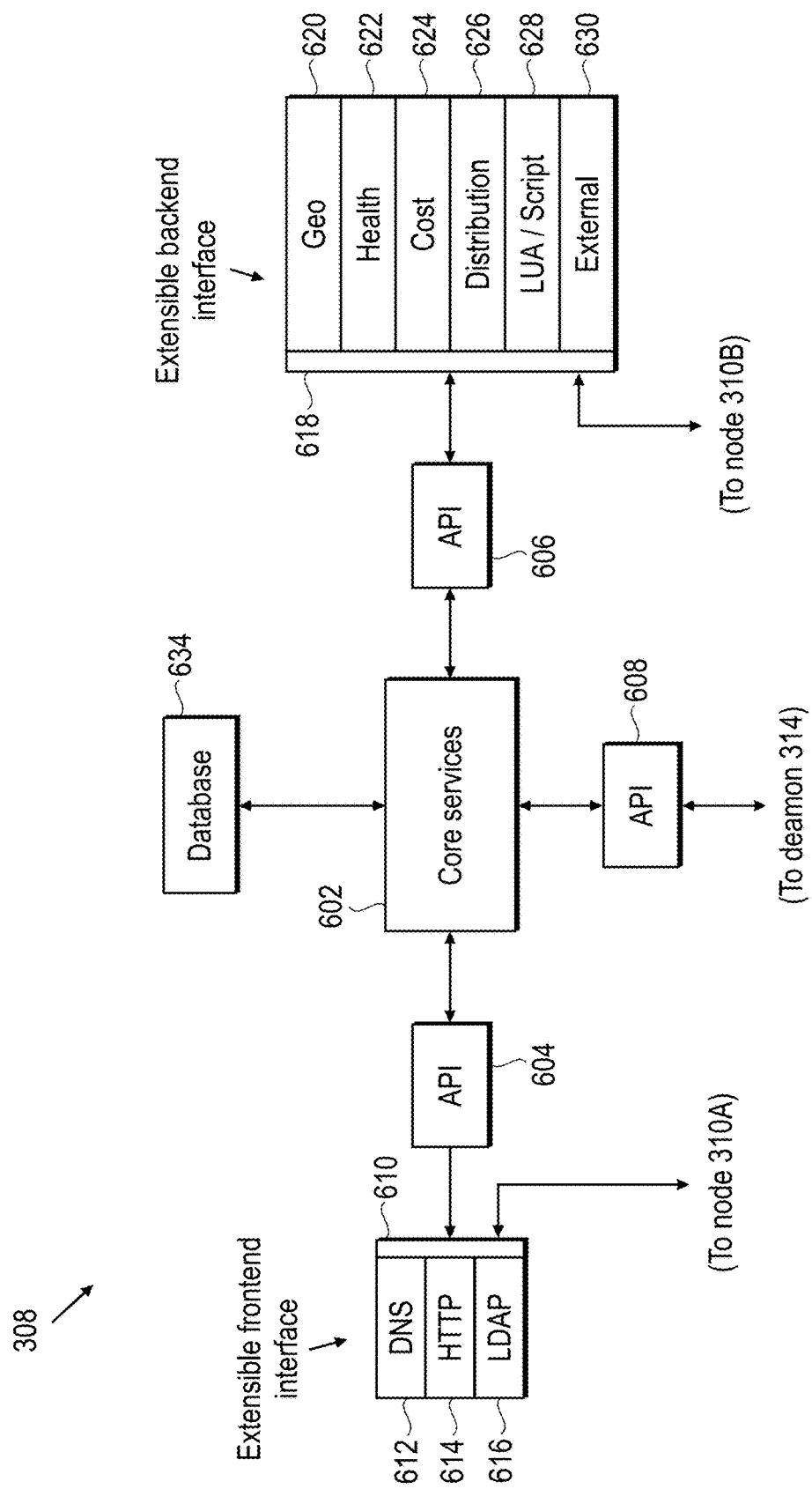
FIG. 6 depicts a block diagram of an extensible global software load balancer (GSLB), in accordance with one embodiment of the invention.

FIG. 6 depicts global software load balancer (GSLB) 308, in accordance with one embodiment of the invention. GSLB 308 may comprise core services 602, which may provide the following functionality: protocol handling (e.g., DNS, HTTP, LDAP, Radis), request/response routing, plugin management, logging, reporting, load balancing, and cluster management. Core services 602 may be communicatively coupled to database 634 which stores the address of each node, the address translation for the resources it is managing, and/or other configuration information. For clarity, it is noted that database 634 is separate from repository 502 of middleware 306.

Core services 602 may also be communicatively coupled to an extensible frontend interface 610 via API 604. Frontend interface 610 is generally responsible for receiving requests from clients (which may be node 310A) and providing responses to those requests. Frontend interface 610 may be extensible in the sense that its functionality may be extended by adding plugins. For instance, DNS plugin 612 may be included to allow GSLB 308 to communicate with a DNS server (not depicted); an HTTP plugin 614 may be included to allow GSLB 308 to communicate with an HTTP server (not depicted); and a lightweight directory access protocol (LDAP) plugin may be included to allow GSLB 308 to communicate with an LDAP server (not depicted).

In one embodiment, frontend interface 610 may provide an enhanced response to node 310A based on metadata (e.g., named authority pointer (NAPTR) records). A NAPTR record may contain an order value 16-bit unsigned integer specifying the order in which the NAPTR records must be processed), a preference (a 16-bit unsigned integer that specifies the order in which NAPTR records with equal order values should be processed), a set of flags e flags to control aspects of the rewriting and interpretation of the fields in the record), a service name (i.e., that specifies the service(s) available down a rewrite path), a regular expression rule (i.e., A STRING containing a substitution expression that is applied to the original string held by the client in order to construct the next domain name to lookup) and a replacement pattern the next name to query for NAPTR, SRV, or address records depending on the value of the flags field).

Core services 602 may also be communicatively coupled to an extensible backend interface 618 via API 606. Backend interface 618 is generally responsible for interfacing with backend servers (which may be node 310B) in order to determine a response to a client request. Backend interface 618 may be extensible in the sense that its functionality may be extended by adding plugins. For instance, geo plugin 620 may be included to allow GSLB 308 to make a geography based decision (e.g., which resources are geographically closest); health plugin 622 may be included to allow GSLB 308 to make a health based determination (e.g., is a server up or down); cost plugin 624 may be included to allow GSLB 308 to make a cost based decision (e.g., whether the operator network is more expensive than a traditional CDN); and distribution plugin 626 may be included to allow GSLB 308 to make a distribution based decision (e.g., half of the data packets should be distributed to North America, and half of the data packets should be distributed to Africa). One or more of the plugins may be "chained together" in the sense that the output of one plugin may be provided as the input of another plugin. Lastly, LUA scripting component 628 and external interface 630 may be provided for customers (e.g., content provider or network operator) to write a script that implements their business logic. Normally, adding new code involves writing C or C++ code, adding test cases, and going through a full production release cycle. What is being allowed here is writing a simple script. The scripting environment provides a protective layer between the core server and the code, hence the script is safe to use without the drawn out release process.

Core services 602 may also be communicatively coupled to daemon 314 via API 608.

The following are some specific examples of how nodes may interact with GSLB 308. Supposing that node 310A wanted to relay a request to another node, node 310A could ask GSLB 308 which node the request should be relayed to. If GSLB 308 has information about network failures and network paths, GSLB 308 could tell node 310A to go to node B instead of node A because there is a good path to node B. Supposing that node 310A wanted to find the least loaded server in a pod (i.e., a cluster of nodes), then GSLB 308 could build a list of targets, ask each target for its current load, then provide the list back to node 310A. Node 310A could pick one or more services to return the desired data. It could also provide back to GSLB 308 actual performance data on a future request or out of band request. This would cover the case where the least loaded server may be on a less desirable network path (i.e., one with poor performance). To summarize, a node may communicate with GSLB 308 to find the best node, and then GSLB 308 may communicate with target nodes to determine which of the nodes in fact is the best node.

Figure 7:
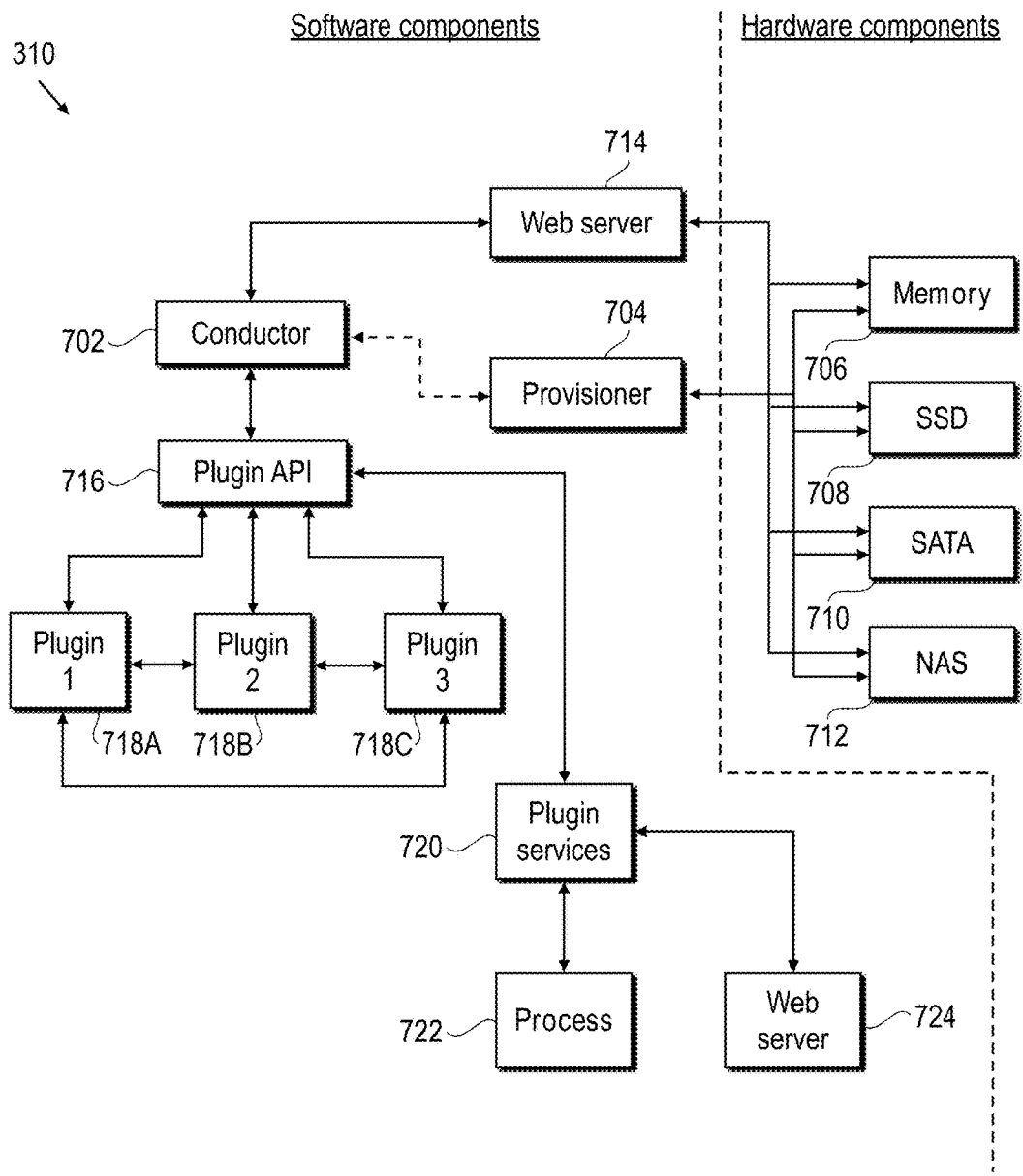
FIG. 7 depicts a content distribution node, in accordance with one embodiment of the invention.

FIG. 7 depicts a block diagram of node 310 (e.g., node 310A, node 310B, or any other node in a CDN context), in accordance with one embodiment of the invention. Node 310 may include conductor 702 which may be a HTTP proxy used to deliver CDN services. Conductor 702 may communicate with Provisioner 704 via an out of band communications channel. Provisioner 704 may be responsible for managing content on a CDN server, and may attempt to ensure that the most popular content (e.g., in the form of a file) is stored on the fastest form of storage, and the least popular content is stored on the slowest form of storage. Four exemplary forms of storage are illustrated in FIG. 7: memory 706, solid state drive (SSD) 708, SATA drive 710 and network attacked storage (NAS) 712 (with memory 706 being the fastest form of storage, SSD being the next faster form of storage and so on). In response to an increasing popularity of content (or other metric), the content can be promoted to a faster form of storage, or in response to a decreasing popularity of content (or other metric), the content can be demoted to a slower form of storage. If the content is no longer needed, the content can be deleted. Provisioner 60 may also help conductor 80 to determine whether certain content is stored in one or more of storage devices 706, 708, 710 and 712.

Conductor 702 may additionally communicate with web server 714, which may be a standard web server that allows for content to be directly served without having the content pass through a proxy. Web server 714 may allow node 310 to be configured as an origin server. It is noted that web server 714 (and other software components of node 310) may be one or more processes running on a cloud computing platform (which includes one or more of memory 706, SSD 708, SATA drive 710, NAS 712).

Conductor 702 may additionally communicate with a plurality of plugins (718A, 718B and 718C) via plugin API 716. While three plugins have been depicted, it is understood that any number of plugins may be present in node 310. Each of the plugins may be written in C++ and/or by scripts. Further, each of the plugins can communicate with one another. For example, the output of plugin 718A could be provided as input to plugin 718B.

Conductor 702 may additionally communicate with plugin services 720 via plugin API 716. Plugin services 720 allow other services to be integrated into node 310. Two specific services of plugin services 720 may be an internal client and an internal origin. To illustrate the functionality of an internal client, consider that in web server 724, as part of a plug in, that plug might need to call out to another web server in HTTP to perform some function. One rendition of that is a protocol called Internet content adaptation protocol (ICAP) that is commonly used to call out to security devices to perform tasks such as authentication or virus scanning. An internal client could make that request to the security device. As another example, the internal client could call out to an ad server to determine what ad to insert. As another example, the internal origin could embed a new application library into the server and have it respond directly.

To illustrate the functionality of an internal origin, consider just in time packing where streaming media is converted into whatever output format that is desired. Such task can be performed by an internal origin. Instead of making a request to a component external to node 310 to make that conversion happen, a single common format of the media may be stored, and then the media may be repackaged in the desired output format (i.e., known as transmuxing). The internal origin allows a way of very flexibly embedding new logic into node 310. Further, consider the instance that two services should be run on the same box. Supposing that you do not want to take the overhead to an HTTP, the internal origin provides a way to flexibly communicate with an external server (i.e., a server external to node 310) to get a response to the client request.

One difference between an internal client and an internal origin is that the internal client only can communicate using HTTP, while the internal origin can communicate using whatever protocol it decides to implement. If the internal origin is going to use HTTP, it will create one instance of an internal client to make that request. As another difference, an internal client exists just for one request, while an internal origin is created when the conductor is started and exists until the conductor is terminated.

Figure 8:
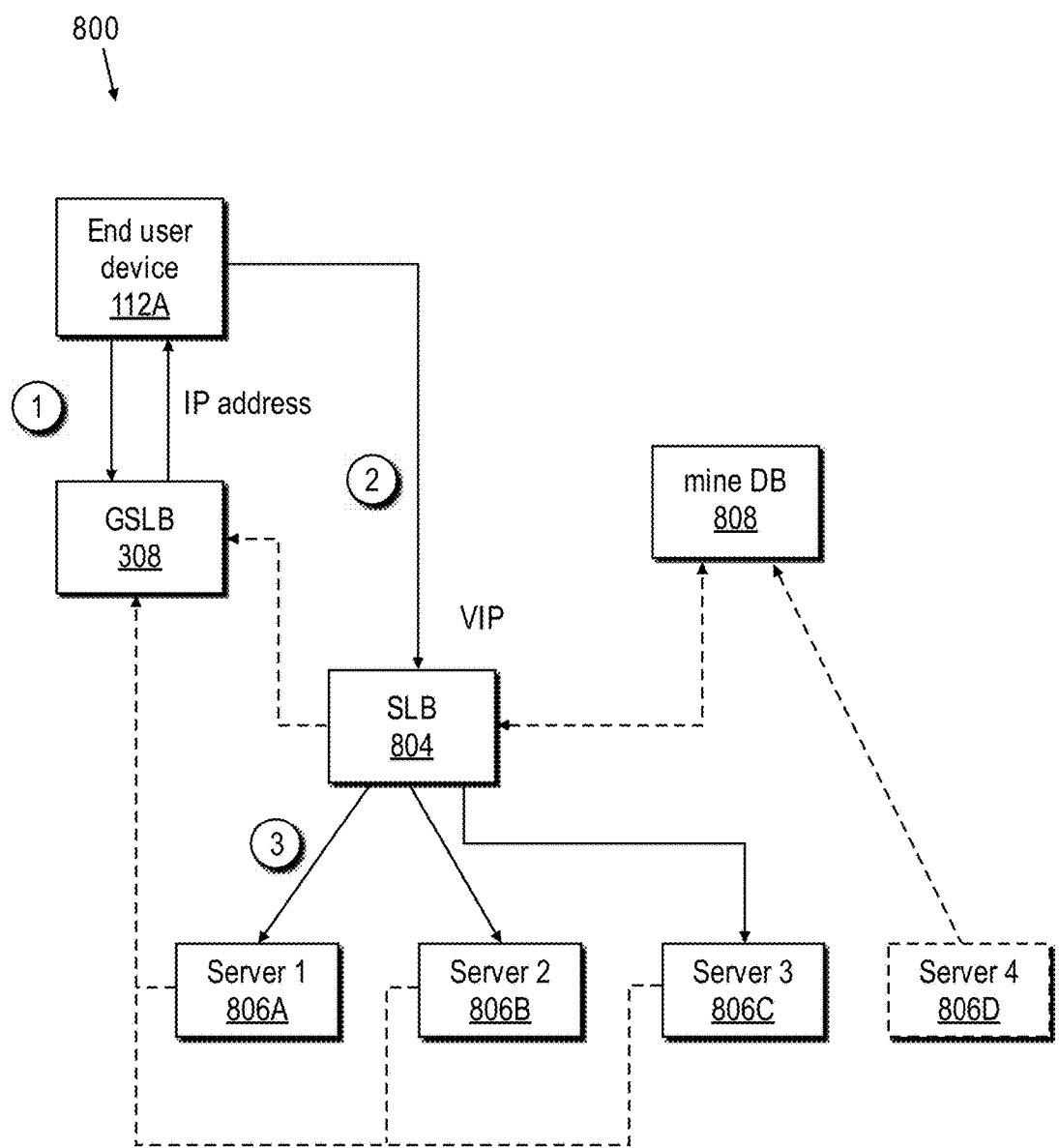
FIG. 8 depicts a load balancer communicatively coupled to a cluster of nodes that is configured to perform a dynamic discovery and an auto configuration of new nodes, in accordance with one embodiment of the invention.

FIG. 8 depicts request flow 800 that is initiated by end user device 112A for accessing one or more of the nodes (e.g., 806A, 806B, 806C) that have been provisioned by middleware 306. At step one, end user device 112A may communicate with GSLB 308 to determine where to send its request. GSLB may then provide end user device 112A with an IP address, which may correspond to the virtual IP (VIP) address of a software load balancer. In the present example, it is assumed that the IP address corresponds to the VIP address of software load balancer (SLB) 804. (This example assumes that a cluster of nodes has been provisioned, in which case, end user device 112A does not directly communicate with a node, but rather communicates with a node via SLB 804.) At step two, end user device 112A may transmit its request to SLB 804. At step three, SLB 804 may select one of the backend servers (806A, 806B, 806C) to respond to the request of end user device 112A, and forwards the request to the selected backend server.

In accordance with one embodiment of the present invention, the size of the cluster of servers may be dynamically varied (e.g., increased and/or decreased). To illustrate a dynamic increase in the size of a cluster, assume that server 806D is being added (e.g., newly instantiated by middleware 306). Server 806D may first register itself with mine DB 808 (e.g., by transmitting metadata such as its role and location). SLB 804 may periodically query mine DB to determine whether it (i.e., SLB 804) should manage any servers, based on their respective role and/or location. Once server 806D has registered with mine DB 808, SLB 804 may discover server 806D through mine DB 808. SLB 804 may then manage server 806D. Servers may be removed from a cluster in a similar manner. To summarize, FIG. 8 illustrates how a request from an end user may be globally routed to a node, and how load balancing is achieved via a dynamic discovery and auto configuration of new nodes.

Figure 9A:
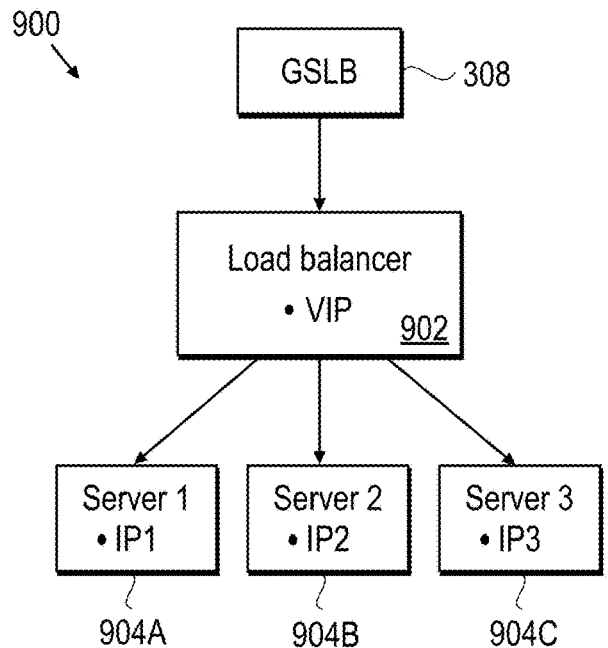
FIG. 9A depicts a conventional load balancer communicatively coupled to a cluster of nodes.
Figure 9B:
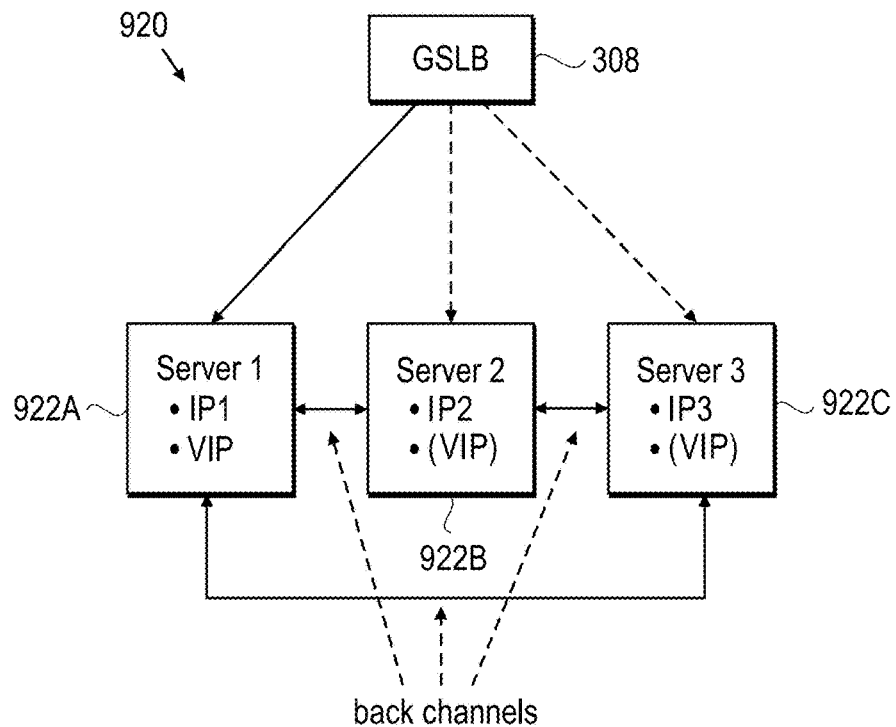
FIG. 9B depicts a cluster of nodes within which a load balancing functionality has been integrated therein, in accordance with one embodiment of the invention.

FIG. 9 (including FIGS. 9A and 9B) describe a variant to the load balancing techniques described in FIG. 8. FIG. 9A presents some background information, and FIG. 9B presents a load balancing technique, in accordance with one embodiment of the invention. FIG. 9A depicts how load balancing has been conventionally performed via an F5 load balancer (902) (from F5 Networks, Inc.™ of Seattle, Wash.). GSLB 308 may route traffic to load balancer 902 by way of its VIP, and load balancer 902 may balance the traffic to backend servers (904A, 904B and 904C) in accordance with a desired policy. One drawback with configuration 900 of FIG. 9A is that F5 load balancers are expensive, costing around $25,000 to $100,000. Further, load balancer 902 is a physical appliance (rather than a virtual appliance), which requires a person to physically place the appliance in a datacenter (or other location) and physically connect the appliance to the network. In other configurations, load balancer 902 could be a virtual appliance, but there would still be costs associated with acquiring a license for the virtual appliance.

FIG. 9B depicts configuration 920 to perform load balancing, in accordance with one embodiment of the invention. In configuration 920, the functionality of load balancer 902 has been incorporated into each of nodes 922A, 922B and 922C. Instead assigning a VIP to a software or physical load balancer, a VIP may be temporarily registered to one of the nodes within the cluster of nodes, and periodically reassigned from one of the nodes to another one of the nodes.

In configuration 920, GSLB 308 may direct a request to the VIP which is registered to one node in the cluster of nodes (assume in the example that it is assigned to node 922A). When node 922A receives the request from GSLB 308, node 922A may need to determine where the request should be routed to based on which node has the requested content, and the current load on each of the nodes. Upon determining a node for handling the request (for ease of discussion, call the determined node to be the "target node"), node 922A may redirect the request to the target node (assume in the example that the target node is node 922C).

In past approaches, such redirection may have been performed via an HTTP redirect. For example, node 922A may have send a response to the client (which sent the request, the client not depicted), instructing the client to connect to node 922C. Such a scheme, however, has a large performance impact.

In contrast to past approaches, the approach in accordance with one embodiment of the invention redirects the request in the following way: Node 922A first terminates a transmission control protocol (TCP) connection with the client. Node 922A then reads enough of the request (e.g., including the URL that is specified in the request) from the client to decide where request should be sent to. At the same time, node 922A stores the packet flow from the client that is associated with the request. Once node 922A decides where the request should be sent to, node 922A may stop receiving packets from the client (e.g., stop receiving the SYN-ACK flow). Node 922A may then use a back channel to send the recorded packets to target node 922C. When target node 922C receives the recorded packets, it essentially replays the setup of the connection, and to target node 922C, it looks like the connection has just started, and target node 922C can generate a response for the client. In summary, this approach provides an efficient way to migrate a TCP connection that initially existed between a first and second node to a first and third node. One advantage of this approach is that no kernel-level modification is necessary (i.e., the kernel associated with each of the nodes). This load balancing scheme could work on MAC, windows and/or any operating system that supports kernel modules.

Figure 10:
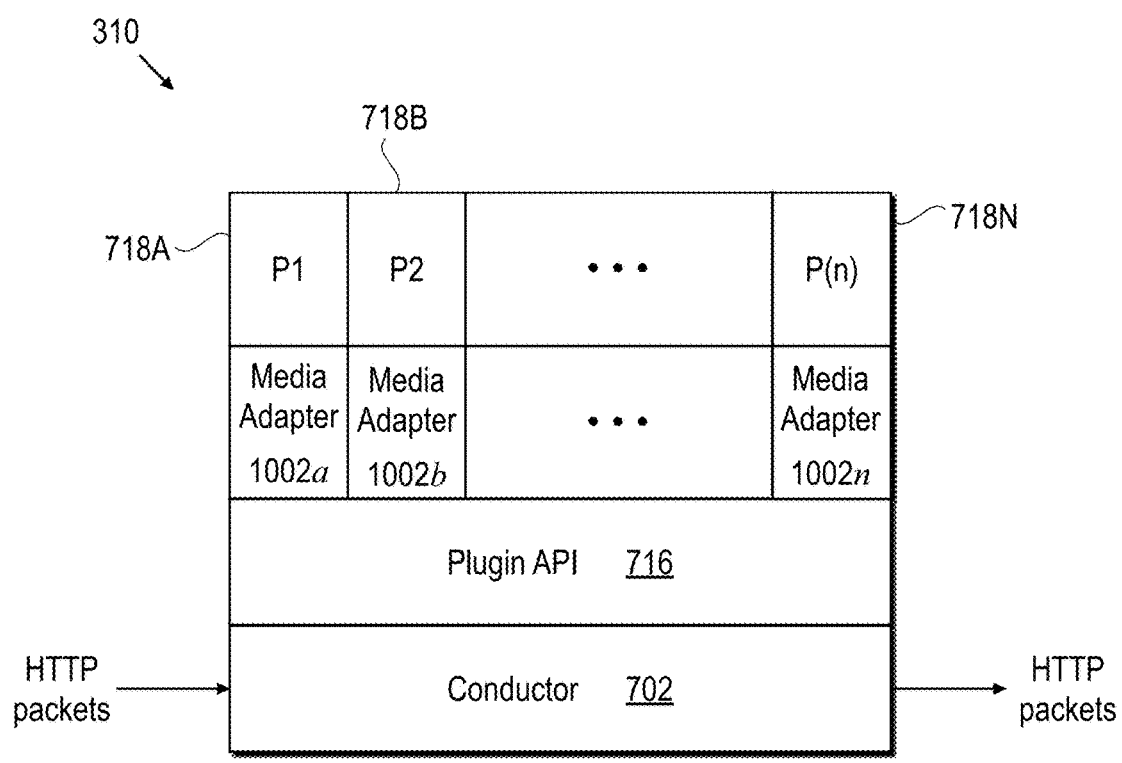
FIG. 10 depicts a plurality of media adaptors which enhances the functionality of plugins, in accordance with one embodiment of the present invention.

FIG. 10 depicts media adaptors 1002a-1002n which may enhance the functionality of one or more of plugins 718A-718N (e.g., may assist one of the plugins to parse the payload of HTTP packets), in accordance with one embodiment of the present invention. To provide some context for the instant media adaptor, in the conventional plugin for an Apache HTTP server (hereinafter, "Apache"), Apache will parse the HTTP request/response and give an application developer access to the headers of the HTTP packets. Apache can manipulate the headers, but when it comes time to understanding the HTTP payload or the body, Apache does not provide any access to that. So, if an application developer desires to insert an ad into a streaming video, the application developer would need to have domain expertise to be able to parse the video container, and write manipulation methods to insert or play wherever you want to do to it, but it means the application developer would need to have a lot of domain expertise to do any type of media manipulation. For instance, suppose an application developer wanted to perform media manipulation (e.g., wanted to insert an ad or a banner or an overlay), but knew nothing about HTTP, HTML or CSS, a media adaptor would allow the application developer to perform such operation without needing to understand the syntax in which the payload is encoded.

Returning to FIG. 10, each of plugins 718a-718n may be coupled to plugin API 716 via its own media adaptor 1002a-1002n, providing enhanced functionality to each of the plugins. Stated differently, each of the media adaptors 1002a-1002n may be interpreted as an extension of plugin API 716. Upon, for example, plugin 718a being instantiated, media adaptor 1002a could provide plugin 718a with additional functionality. As a result of the media adaptors, the plugins can perform media processing that it could not do otherwise. For example, media adaptor 1002 may return the payload of the HTTP packets in an XML structure to the plugins, and further may provide the plugins with methods to manipulate that payload. Media adaptor 1002 may include custom logic that allows the generation of a custom manifest for each end user device 112A-112P, alternate content insertion, rebranding of responses, limiting bitrates that are served depending on the network conditions, etc.

To elaborate, media adaptor 1002 may be interpreted as an abstraction layer that hides the details of parsing complex files so that the plugin can perform an operation on the payload of the HTTP packet in a few lines of code (e.g., 10 lines) instead of many lines of code (e.g., 1000 lines). Media adaptor 1002 allows an application developer to write a plugin with much lower level of expertise. Media adaptor 1002 performs the heavy lifting for the application developer. All the application developer needs to know is that he/she want to insert an ad. Media adaptor 1002 can determine from the payload of the HTTP packets when there is an ad mark, and the plugin can insert an appropriate ad at such ad mark.

Figure 11:
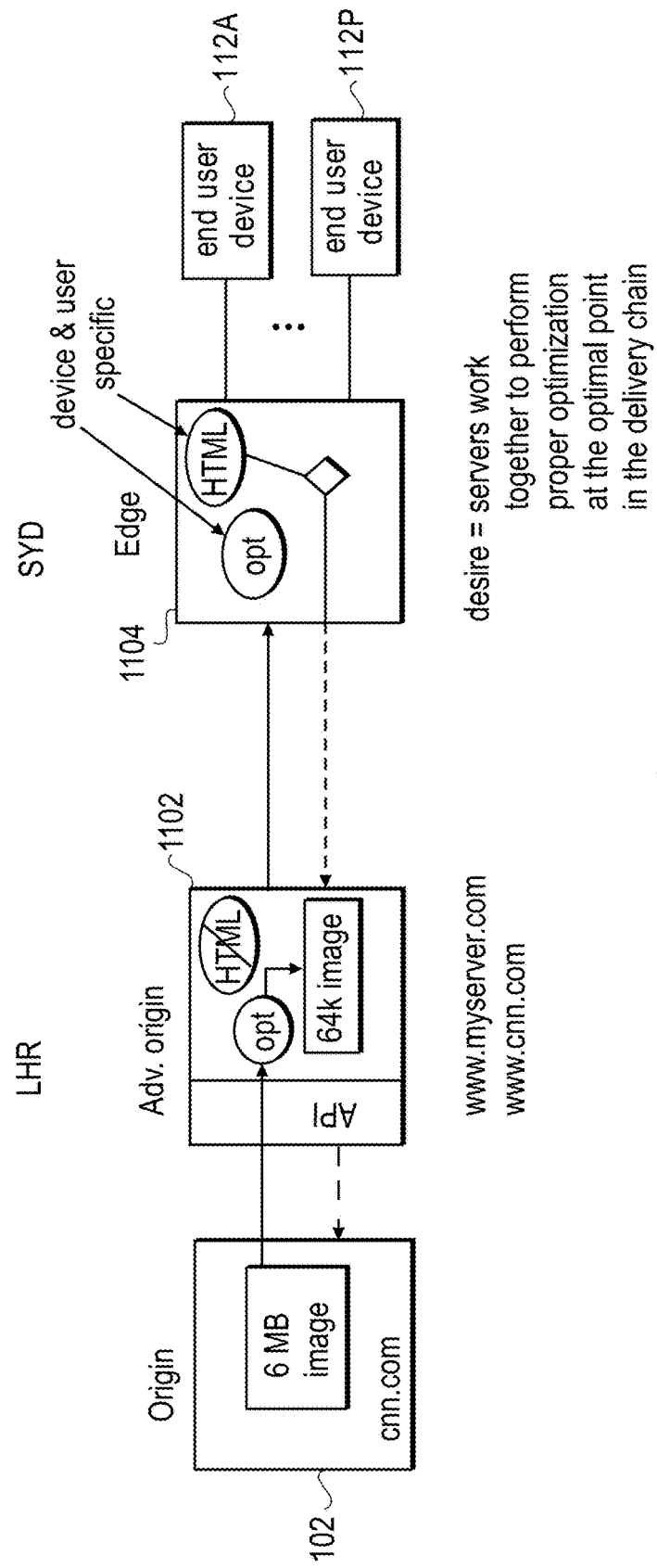
FIG. 11 depicts a communication network for distributing content from an origin server to end user devices, in accordance with one embodiment of the present invention.

FIG. 11 depicts a communication network for distributing content from an origin server to end user devices, in accordance with one embodiment of the present invention. For instance, suppose origin server 102 (e.g., hosting cnn.com) would like to serve a 6 MB image to end user devices 112A-112P. Origin server 102 does not want to send all the end user devices the 6 MB image (since some of the end user devices may be connected via low bandwidth links), so when advanced origin 1102 receives the image, advanced origin 1102 will optimize the 6 MB image, for example, into a version that is 64 KB. There are two models for performing such optimization. In general, web page optimization has been performed in front of the origin (i.e., web page optimization is physically deployed on the origin or as a reverse proxy in front of the origin) and is problematic because the new image (i.e., the 64 KB image) has a new name to point back to origin server 102. The new name means that the new image will not be delivered via an optimized path as a result of request routing on a CDN. To handle this, the URL may be wrapped with a CDN domain name, then the URL may be mapped back to the original cnn.com when we really want to talk with the origin. That means any request to retrieve the optimized image will go all the way back to advanced origin 1102 (i.e., normally the closest CDN POP to the actual origin) to retrieve it, and if the ingest server is in Australia, this is a very long time, so the CDN is served at the edge. Because the URL (or in HTML, the href element) has been rewritten with the name of the server that optimized it, it will go back to origin server 102 every time.

On the edge portion on the right of the optimization, there is a device (e.g., 112A-112P). Information concerning the device (e.g., iPhone vs. Android, version of operating system, presence of retina display, etc.) may be normally derived from the HTTP User-Agent header, but it can be derived from other sources. For example, in a mobile network I know the exact device from the handset ID and the policy database. It may be desirable to tailor the content that is delivered to the devices based on technical considerations (i.e., information concerning the device, network conditions, etc.) as well as business considerations (i.e., provide a certain level of service to user only if user subscribes to a certain plan, SLA, etc.). In current CDN configurations (e.g., such as in FIG. 1), a CDN node does not have access to the information concerning the devices, so the CDN can not appropriately tailor the content to the devices. However, in the instance that the CDN node is placed in the operator network, the CDN node does have access to the above-mentioned information regarding the device, and so it can appropriately tailor the content to the device. For example, if origin server 102 is providing a jpeg image and the end user may be running Chrome or Internet explorer (IE), and IE does not support in-lining, but Chrome does support in-line, the HTML for the Chrome browser can provide the image in-lined, saving the browser from having to request the image in a second step.

Figure 1:
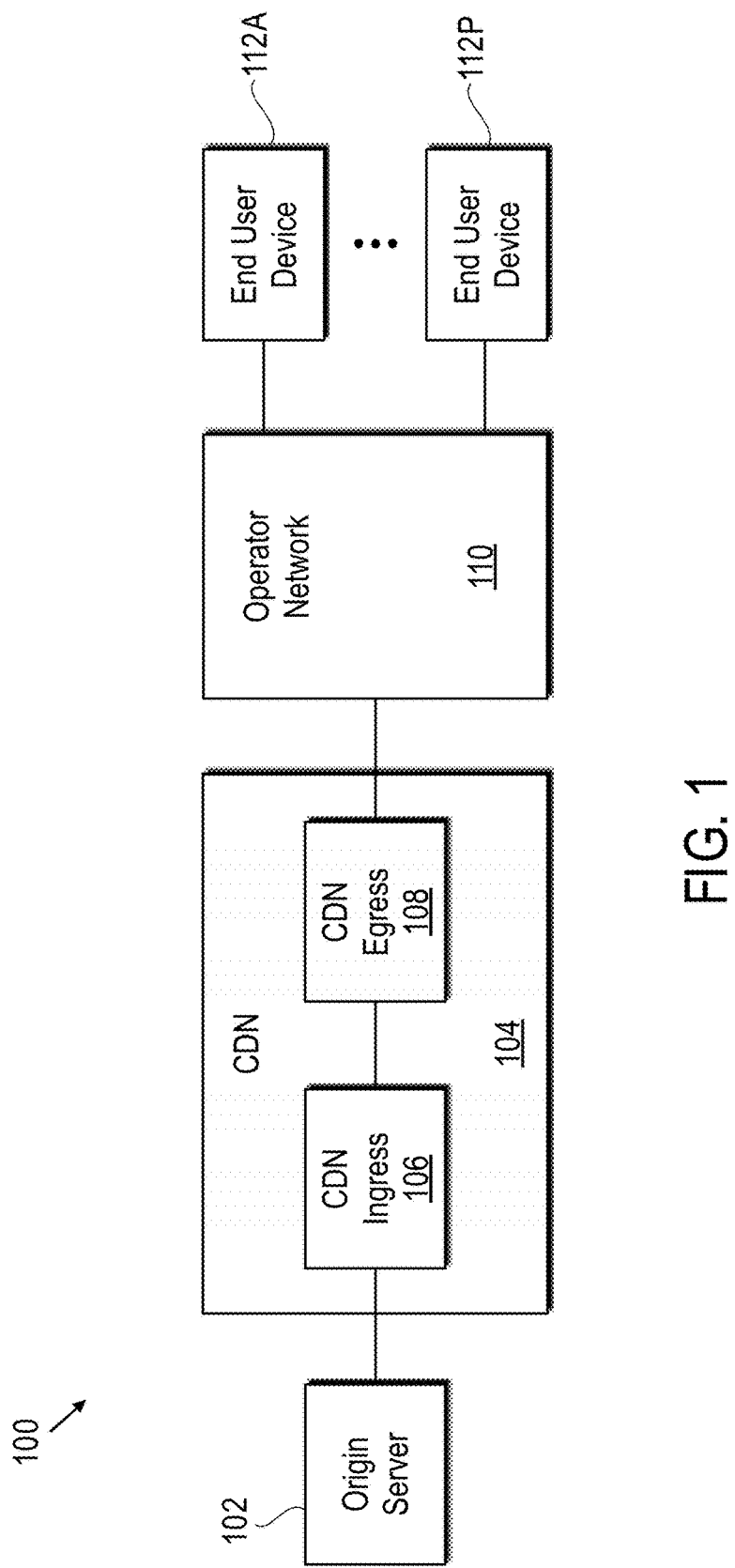
FIG. 1 depicts a communication network for distributing content from an origin server to end user devices.

What is desired is for the servers (e.g., origin server 102, advanced origin 1102, and edge server 1104 in FIG. 11, or any of the servers depicted in FIG. 1) to work together. The desire is that servers work together to perform proper optimization at the optimal point in the delivery chain. The best example would be HTTP deduping where duplicate content is replaced with a tag (i.e., any device along the path can replace that tag with a cached copy). You can consider it subobject caching. The very best approach would to have the deduping happen at the origin, and the client fill in the pieces with its cached copy on its device. This creates the smallest possible data transfer resulting in the best performance. But if a client did not support that service, it could be handled by an edge node. Also, consider that a node along the way may want to alter the content, it may dedupe, and repackage the content for the client. So what is desired is for origin server 102 to instruct advanced origin 1102 that when there is HTML content, do not parse it because it is extremely expensive in terms of memory and CPU costs. At edge 1104, the content is parsed. And when edge 1104 wants an image optimized and there is an already optimized version of the content available, then edge 1104 comes back to origin server 102 and asks origin server 102 to go retrieve original image from the beginning to optimize the image and return it to edge 1104. And so the request is modified. Here is the URL you are going to give me and the encoding has the optimized encoding on it and it said you're (i.e., origin server 102 or advanced origin 1102, depending on where our software is deployed) going to the do the optimization origin not me the edge.

Figure 12:
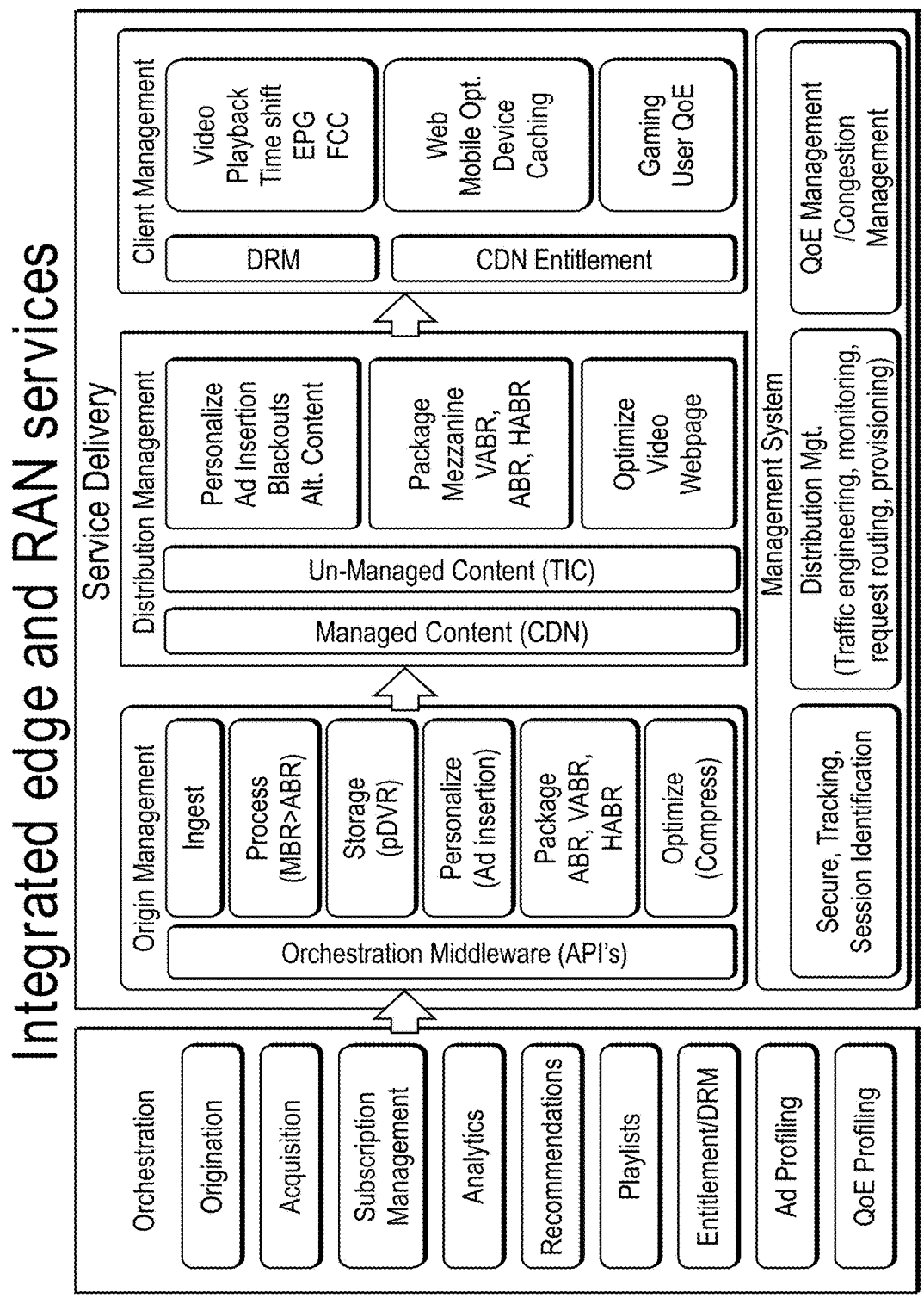
FIG. 12 depicts a flow diagram of integrated edge and radio access network (RAN) services, in accordance with one embodiment of the invention.

FIG. 12 depicts a flow diagram of integrated edge and RAN services, in accordance with one embodiment of the invention. The integrated services may include an orchestration module which communicates with a service delivery module. The orchestration module may be configured to perform the functions of origination, acquisition, subscription management, analytics, recommendations, playlists, entitlement/DRM, ad profiling and quality of experience (QoE) profiling. The service delivery module may include four key components: an origin management module, a distribution management module and a client management module. Within the origin management module may be the following modules: an ingest module, a process module, a storage module, a personalize module, a package module and an optimize module. Each of these modules may communicate with the orchestration module via an orchestration middleware (which includes a set of APIs). Within the distribution management module may be a personalize module, a package module and an optimize module. Each of these modules may communicate with the origin management module via a managed content (CDN) and/or un-managed content (TIC) interface. Within the client management module may be a video module, a web module, and a gaming module. Each of these modules may communicate with the distribution management module via a CDN entitlement and/or DRM interface. Within a management system may be a module that performs secure, tracking and session identification; a distribution management module that performs traffic engineering, monitoring, request routing and provisioning; and a QoE management module that performs congestion management. The QoE management module is a policy plugin that communicates with the RAN manager and then changes configurations on a request by request basis.

Figure 13A:
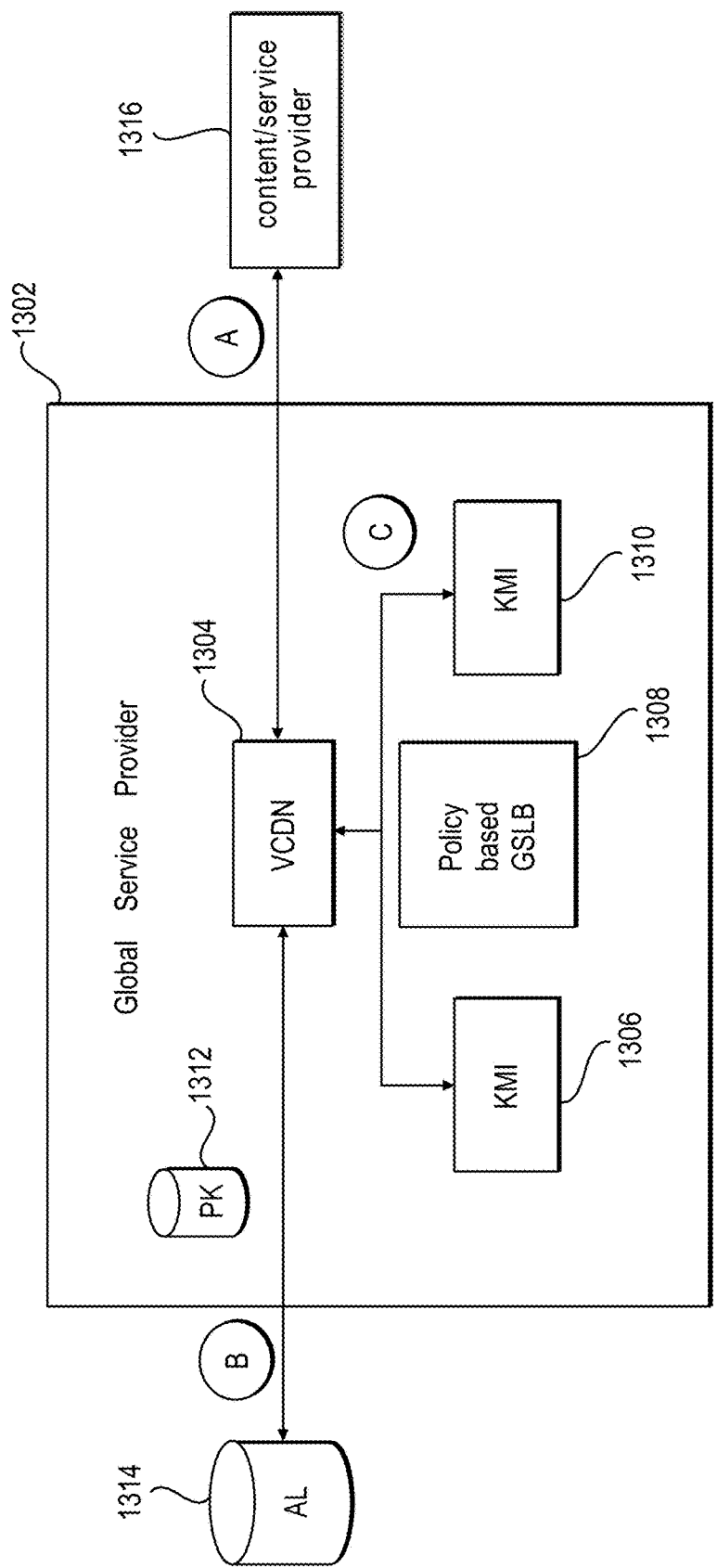
FIGS. 13A-13C depict system diagrams of a two-party secure sockets layer (SSL) handling using a trusted intermediary, in accordance with one embodiment of the invention.
Figure 13B:
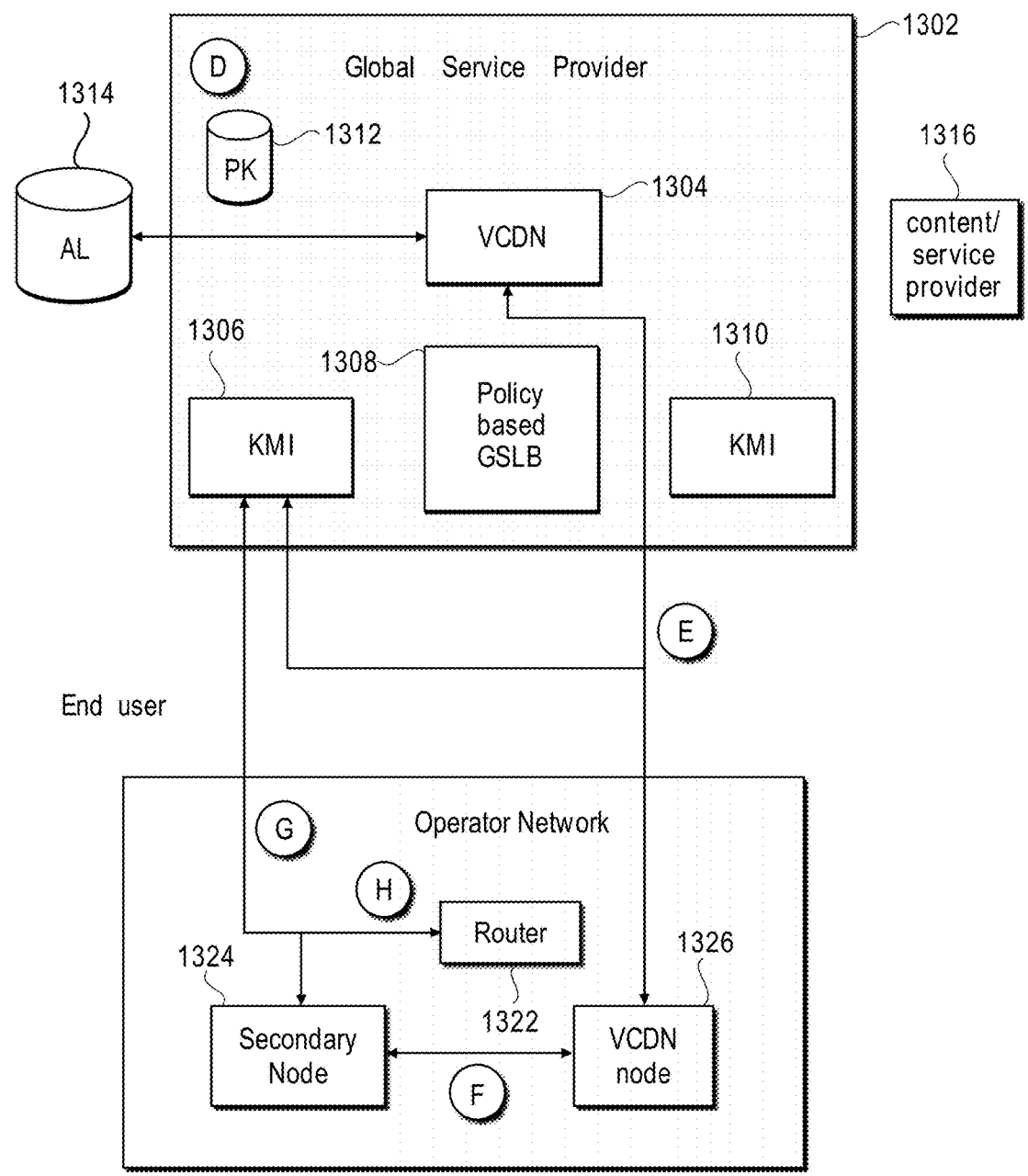
Figure 13C:
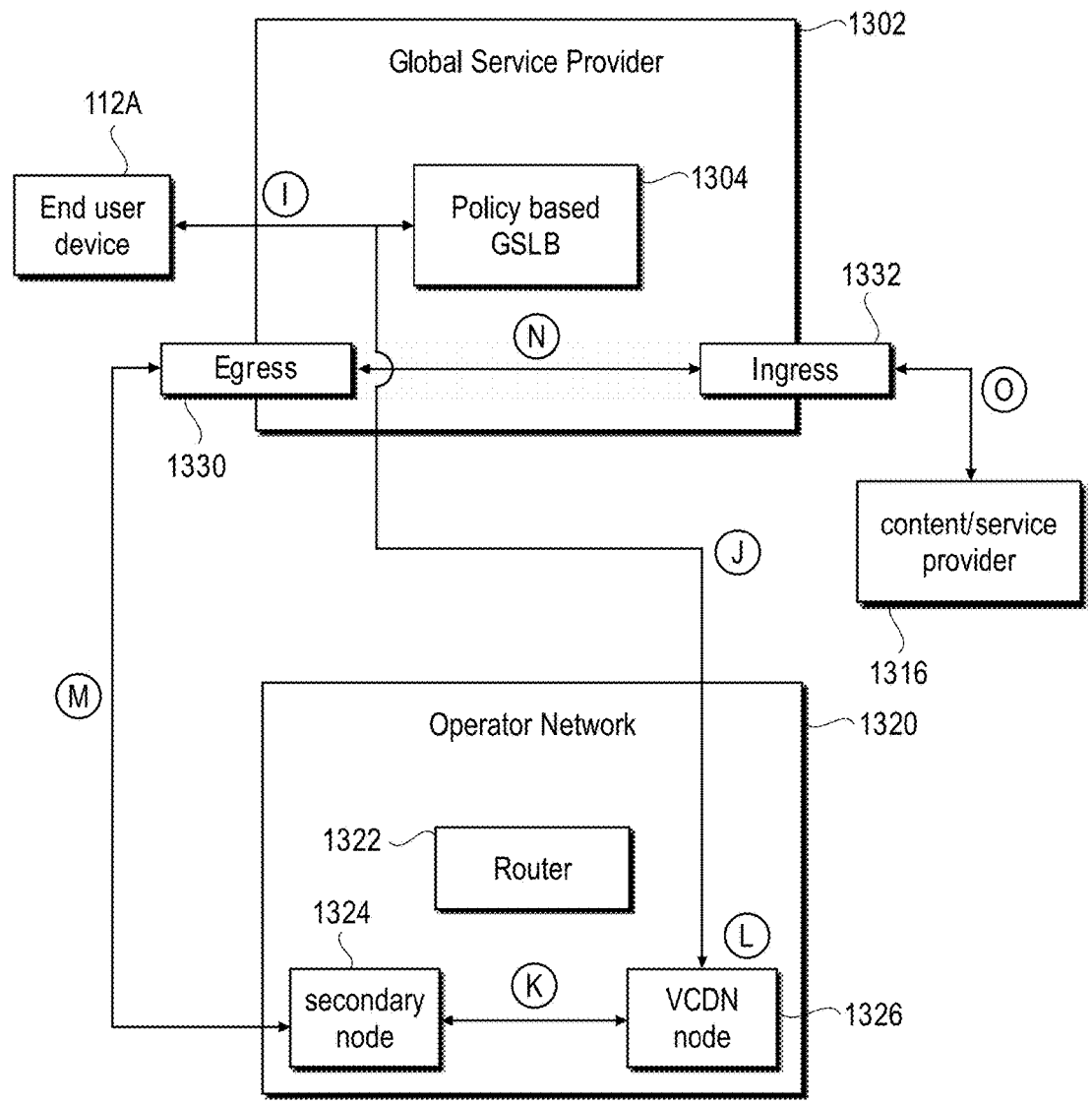

FIGS. 13A-13C depict system diagrams of a two-party secure sockets layer (SSL) handling using a trusted intermediary, in accordance with one embodiment of the invention. Before describing the system diagrams, some background is first provided. The increased use of SSL improves end user trust that is critical for applications like finance and e-commerce. However, SSL has the undesired impact of reducing the quality of experience (QoE) for Internet content providers, resulting in the reduced consumption of the content provider's content.

Today content providers routinely delegate the managing of the security of their network and services to trusted third party providers, such as CDN operators. While there have been several approaches to solving the need for increased security while retaining current QoE levels, all have failed to address the need for having a trusted third party. Many of existing trusted third party providers have significant holes in the management of the content provider's security credentials (e.g., insecure storage of security credentials; credentials transmitted in the blue; weak authentication; down graded security between the terminating edge node, internal servers, and in some cases the customer origin).

What is needed, and what is provided by one embodiment of the invention is:

(1) a trusted Global Service Provider (GSP) to act as the intermediary between an operator end-point and a content/service provider, (2) secure management of security credentials between the content provider and the trusted GSP, (3) the creation of a secure service on a second party's network which is capable of servicing an end user with the content/service provider credentials without exposing those credentials to the second party, (4) secure routing of the users request for service or content too the Trusted GSP or directly to the content provider, (5) verification of the transmission integrity and secondary party, and (6) economic incentives sufficient to benefit all parties in the delivery chain.

A process which may be performed in association with FIGS. 13A-13C is now described. In "step A" (of FIG. 13A), a content/service provider 1316 (an example of origin server 102) may upload security credentials to VCDN service 1304, a selected trusted provider (e.g., GSP 1302), and/or authorized locations (AL) 1314. PK 1312 may be present in GSP 1302 because GSP may be acting as a certificate authority (CA). The public key that is provided may be stored in KMI 1306. More particularly, content/service provider 1316 may open a secure connection such as a VPN or SSL and then transfer the SSL certificate (which is a file that will be placed on a secure storage device). In "step B", VCDN service 1304 may generate certificates for use by secondary party services along with asymmetric keys used to authenticate Internet network service enablement. In "step C", all keys may be stored in secure Key Management Infrastructure (KMI), that store the private key (1306, 1310) for access by GSP 1302 and secondary party nodes 1324 (depicted in FIG. 13B, 13C).

In "step D" (of FIG. 13B), VCDN service 1304 may provision a VM/Container using credentials provided to GSP 1302 by content/service provider 1316. In "step E", VCDN node 1326 may securely load customer certificates and asymmetric communications keys into KMI 1306. In "step F", VCDN node 1326 may register itself with secondary provider node 1324. In "step G", secondary provider node 1324 may read a VCDN issued certificate (that secondary provider node 1324 uses to identify itself) from KMI 1306. In "step H", secondary provider node 1324 may register the VIP of VCDN node 1326 in the BGP tables of router 1322.

In "step I" (of FIG. 13C), end user device 112A may request a web resource from GSP 1302. In "step J", policy based GSLB 1304 may send the HTTP request (from end user device 112A) to geo-located VCDN node 1326. In "step K", VCDN node 1326 may encrypt the payload of the HTTP request with the asymmetric key generated by GSP 1302, that only GSP 1302 can decrypt. Such encryption is advantageous in the event that the HTTP request includes private information of end user device 112A (e.g., a password) and it is desired that such private information not be intercepted in the insecure network between VCDN node 1326 and Egress 1330. In "step K", VCDN node 1326 may forward the request to secondary provider node 1324, which validates the server certificate of the request to avoid man-in-the-middle attacks. In "step M", secondary provider node 1324 may open a secure connection to egress 1330 of GSP 1302. Anycast routing may ensure the shortest route between egress 1330 and secondary 1324. Also in "step M", the request (or response) with the encrypted payload may be transmitted from secondary provider node 1324 to egress 1330. In "step N", GSP 1302 may optimize the route (i.e., protocol and path) between egress 1330 and ingress 1332 to ensure the best throughput and performance (i.e., middle mile optimization). Also in "step N", the payload of the request may be decrypted by GSP 1302 (either at egress 1330 or ingress 1332) so that the payload may be read by content/service provider 1316. In "step O", a secure connection may be established between ingress 1332 and content/server provider 1316. Also in "step O", the request (or response) with the decrypted payload may be transmitted from GSP 1302 to content/service provider 1316.

The advantages of the instant SSL scheme may be summarized as follows: Assume that anything within GSP 1302 can be trusted. Further assume that VCDN node 1326 can be trusted. Anything between VCDN node 1326 and egress 1330 of GSP 1302 may be untrusted, including secondary provider node 1324 (and other intermediaries not depicted). While a data packet may be securely transmitted over SSL links between VCDN node 1326 and egress 1330 (e.g., SSL link between VCDN node 1326 and secondary provider node 1324 and SSL link between secondary provider node 1324 and egress 1330), the data packet (including its payload) may be vulnerable anywhere a SSL link is terminated (e.g., at secondary provider node 1324). To address this security concern, the payload of the data packet may be encrypted at VCDN node 1326 by an asymmetric key that is only known by GSP 1302 before the data packet (now with an encrypted payload) is transmitted to secondary provider node 1324. The data packet may be processed at secondary node 1324 as it normally would be (e.g., it can be routed, cached), but the one difference is that secondary provider node 1324 can no longer read the payload of the data packet because secondary provider node 1324 will not be able to decrypt the payload. It is not until the data packet reaches GSP 1302 that its payload can be decrypted. What is offered by the present solution is a form of double encryption. Not only is the data sent over secure links, but its payload is also encrypted.

Figure 14:
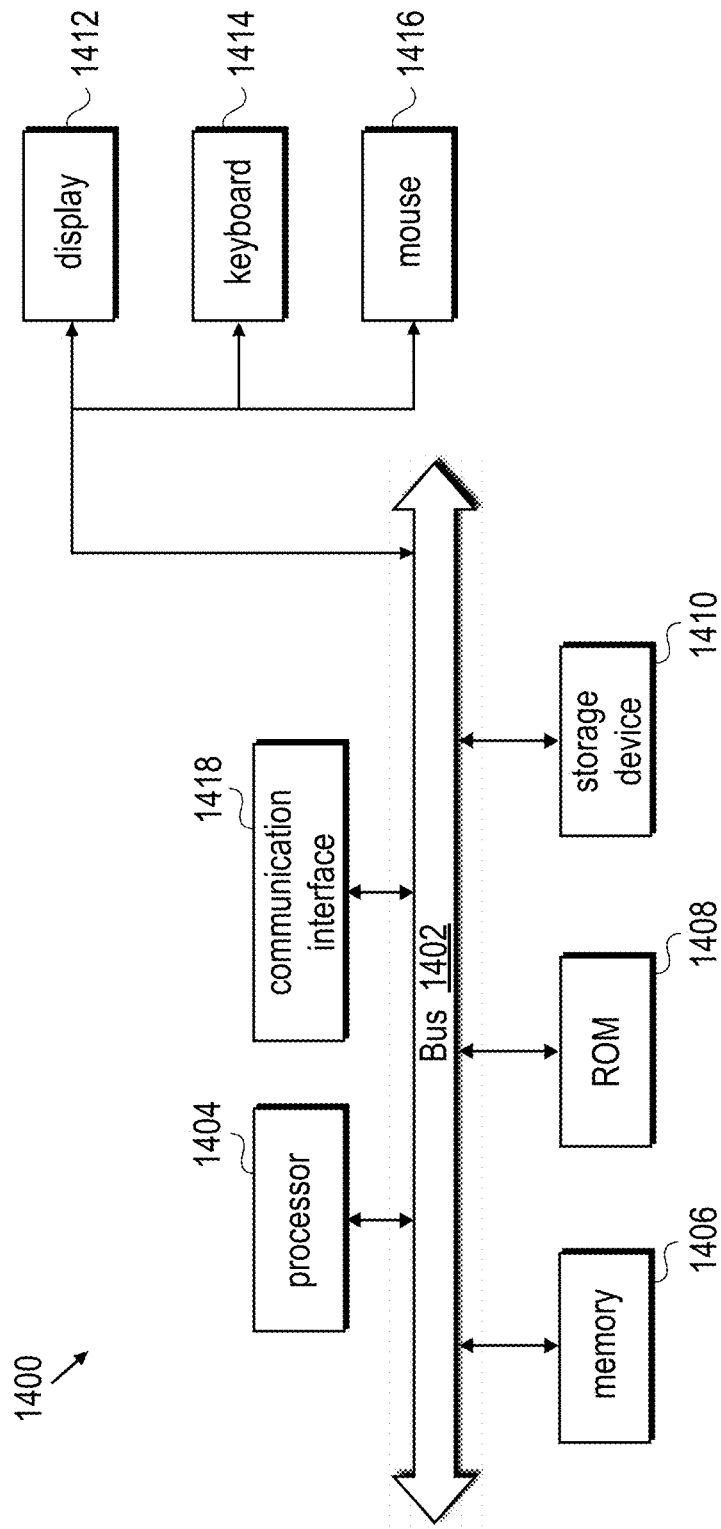
FIG. 14 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 14 provides an example of a system 1400 that is representative of any of the computing systems discussed herein. Note, not all of the various computer systems have all of the features of system 1400. For example, certain ones of the computer systems discussed above may not include a display inasmuch as the display function may be provided by a client computer communicatively coupled to the computer system or a display function may be unnecessary. Such details are not critical to the present invention.

System 1400 includes a bus 1402 or other communication mechanism for communicating information, and a processor 1404 coupled with the bus 1402 for processing information. Computer system 1400 also includes a main memory 1406, such as a random access memory (RAM) or other dynamic storage device, coupled to the bus 1402 for storing information and instructions to be executed by processor 1404. Main memory 1406 also may be used for storing temporary variables or other intermediate information during execution of instructions to be executed by processor 1404. Computer system 1400 further includes a read only memory (ROM) 1408 or other static storage device coupled to the bus 1402 for storing static information and instructions for the processor 1404. A storage device 1410, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 1404 can read, is provided and coupled to the bus 1402 for storing information and instructions (e.g., operating systems, applications programs and the like).

Computer system 1400 may be coupled via the bus 1402 to a display 1412, such as a flat panel display, for displaying information to a computer user. An input device 1414, such as a keyboard including alphanumeric and other keys, may be coupled to the bus 1402 for communicating information and command selections to the processor 1404. Another type of user input device is cursor control device 1416, such as a mouse, a trackball, or cursor direction keys for communicating direction information and command selections to processor 1404 and for controlling cursor movement on the display 1412. Other user interface devices, such as microphones, speakers, etc. are not shown in detail but may be involved with the receipt of user input and/or presentation of output.

The processes referred to herein may be implemented by processor 1404 executing appropriate sequences of computer-readable instructions contained in main memory 1406. Such instructions may be read into main memory 1406 from another computer-readable medium, such as storage device 1410, and execution of the sequences of instructions contained in the main memory 1406 causes the processor 1404 to perform the associated actions. In alternative embodiments, hard-wired circuitry or firmware-controlled processing units (e.g., field programmable gate arrays) may be used in place of or in combination with processor 1404 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 700 or similar electronic computing device, that manipulates and transforms data represented as physical (electronic) quantities within its registers and memories into other data similarly represented as physical quantities within its memories or registers or other such information storage, transmission or display devices.

Computer system 1400 also includes a communication interface 1418 coupled to the bus 1402. Communication interface 1418 may provide a two-way data communication channel with a computer network, which provides connectivity to and among the various computer systems discussed above. For example, communication interface 1418 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1400 can send and receive messages and data through the communication interface 1418 and in that way communicate with hosts accessible via the Internet.

It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for automatically provisioning one or more nodes of a network infrastructure, the method comprising:
   creating, by a processor, a map file by executing instructions stored on a memory communicably coupled to the processor, said map file specifying where the one or more nodes of the network infrastructure are to be instantiated in an end-to-end content delivery path between a content source and a content consumer, said executing including soliciting and receiving design information for the network infrastructure, including service requirements for the nodes, through a web portal that includes user interface screens displayed by said processor, and storing said map file in a repository that includes first sub-repositories containing packaging information and metadata specifying a type of operating system on which the network infrastructure is being built, and an environment within which the network infrastructure is being built, and second sub-repositories, for storing data of different users, each of the second sub-repositories being mapped to different nodes;
   instantiating, by the processor, instances of said nodes on computer systems within the network infrastructure according to said map file;
   automatically provisioning said nodes as specified by the map file;
   registering Internet protocol (IP) addresses of each of the instances of said nodes with a global software load balancer (GSLB);
   distributing, by the GSLB, services of the end-to-end content delivery path across said instances of said nodes for end user devices; and
   through execution by the processor of further instructions stored on the memory, normalizing said nodes once so instantiated by operating system, function calls, and data types, thereby allowing a unified view of the nodes across the computer systems on which the one or more nodes are instantiated.

2. The method of claim 1, wherein the nodes are deployed as processes on one or more computer resources of one or more cloud computing platforms.

3. The method of claim 1, wherein the nodes are deployed in an operator network.

4. The method of claim 1, wherein the GSLB comprises an extensible frontend interface which includes one or more of a domain name system (DNS) plugin, a hypertext transfer protocol (HTTP) plugin, and a lightweight directory access protocol (LDAP) plugin.

5. The method of claim 1, wherein the GSLB comprises an extensible backend interface which includes a plurality of plugins, and wherein an output of a first one of the plugins is provided as an input to a second one of the plugins.

6. The method of claim 1, wherein the GSLB is communicatively coupled to a cluster of nodes, and wherein a virtual Internet protocol (VIP) address is temporarily registered to one of the nodes within the cluster of nodes, and is periodically reassigned from one of the nodes to another one of the nodes.

7. The method of claim 1, wherein at least one of the nodes comprises an HTTP proxy and a plurality of plugins, and wherein the plurality of plugins communicate with the HTTP proxy via a plugin application program interface (API).

8. The method of claim 7, wherein the plurality of plugins communicate with a media adaptor which is configured to convert respective payloads of data packets from a first format into an extensible markup language (XML) format.

9. The method of claim 1, wherein the nodes are provisioned in a plurality of cloud platforms.

10. An apparatus for automatically provisioning one or more nodes of a network infrastructure, the apparatus including:

a computer system comprising a processor and a memory storing instructions that, when executed by the processor, cause the processor to:

solicit and receive design information for the network infrastructure, including service requirements for the nodes, through a web portal that includes user interface screens displayed by said processor;

create a map file based on the received design information, said map file specifying where the one or more nodes of the network infrastructure are to be instantiated in an end-to-end content delivery path between a content source and a content consumer and store said map file in a repository that includes first sub-operating system of the network infrastructure is being built, and an environment within which the network infrastructure is being built, and second sub-repositories, for storing data of different users, each of the second sub-repositories being mapped to different nodes;

instantiate instances of said nodes within the network infrastructure according to said map file;

automatically provision said nodes as specified by the map file; and normalize said nodes once so instantiated by operating system, function calls, and data types, thereby allowing a unified view of the nodes across the network infrastructure within which the one or more nodes are instantiated; and a global software load balancer (GSLB) registering Internet protocol (IP) addresses of each of the instances of said nodes, and distributing services of the end-to-end content delivery path across said instances of said nodes for end user devices.

11. The apparatus of claim 10, wherein the nodes are deployed as processes on one or more computer resources of one or more cloud computing platforms.

12. The apparatus of claim 10, wherein the nodes are deployed in an operator network.

13. The apparatus of claim 10, wherein the GSLB comprises an extensible frontend interface which includes one or more of a domain name system (DNS) plugin, a hypertext transfer protocol (HTTP) plugin, and a lightweight directory access protocol (LDAP) plugin.

14. The apparatus of claim 10, wherein the GSLB comprises an extensible backend interface which includes a plurality of plugins, and wherein an output of a first one of the plugins is provided as an input to a second one of the plugins.

15. The apparatus of claim 10, wherein the GSLB is communicatively coupled to a cluster of nodes, and wherein a virtual Internet protocol (VIP) address is temporarily registered to one of the nodes within the cluster of nodes, and is periodically reassigned from one of the nodes to another one of the nodes.

16. The apparatus of claim 10, wherein at least one of the nodes comprises an HTTP proxy and a plurality of plugins, and wherein the plurality of plugins communicate with the HTTP proxy via a plugin application program interface (API).

17. The apparatus of claim 16, wherein the plurality of plugins communicate with a media adaptor which is configured to convert respective payloads of data packets from a first format into an extensible markup language (XML) format.

* * * * *